United States Patent [19]

Schneider et al.

[11] Patent Number: 4,887,208
[45] Date of Patent: Dec. 12, 1989

[54] SALES AND INVENTORY CONTROL SYSTEM

[76] Inventors: Bruce H. Schneider, R.R. 1, Fort Calhoun, Nebr. 68023; Jerry S. Schneider, 116 S. 92nd St., Omaha, Nebr. 68114

[21] Appl. No.: 134,932

[22] Filed: Dec. 18, 1987

[51] Int. Cl.$^4$ .............................................. G06F 15/24
[52] U.S. Cl. ................................... 364/403; 235/385;
G06F/15/24
[58] Field of Search ............... 364/401, 403, 404, 405, 364/200/MS, 900/MS, 407; 235/383, 385, 472; 434/98

[56] References Cited

U.S. PATENT DOCUMENTS

| | | | |
|---|---|---|---|
| 3,946,220 | 3/1976 | Brobeck et al. | 364/200 |
| 4,149,246 | 4/1979 | Goldman | 364/900 |
| 4,377,741 | 3/1983 | Brekka et al. | 235/472 |
| 4,516,016 | 5/1985 | Kodron | 235/472 |
| 4,553,222 | 11/1985 | Kurland et al. | 364/900 |
| 4,558,211 | 12/1985 | Berstein | 235/380 |
| 4,651,279 | 3/1987 | Suzuki | 364/405 |
| 4,688,178 | 8/1987 | Connelly et al. | 364/403 |
| 4,734,858 | 3/1988 | Schlafly | 364/408 |

FOREIGN PATENT DOCUMENTS

| | | | |
|---|---|---|---|
| 2490371 | 3/1982 | France | 364/405 |
| 2105075 | 3/1983 | United Kingdom . | |

OTHER PUBLICATIONS

*IBM Tech. Disclosure*, Vol. 18, No. 8, p. 2554, Allmendinger et al., "Point of Sale Terminal with Clerical Facilities/Functions".
*Pat. Abstracts of Jap.*, Vol. 8, No. 6, ABS No. 58-169285, Shimuzu, "Electronic Cash Register".
*Direct Marketing*, Jul., 1983, pp. 101-107, "Comp-U-Store System Could Change Retail Economics".
*Nation'S Business*, March, 1984, p. 57-58, Gatty, "Setting up Shop on Computer Screens".
*Videodisc and Optical Disk*, vol. 5, No. 4, pp. 244-247. "Furniture Store Waxes Sales with Installation of Mini", *Computerworld*, vol. 18, No. 24, Jun., 1984, pp. 63-64.
Fink, "On-Line Ticket System at Wickes Furniture", *Retail Control*, vol. 53, No. 4, Dec., 1984, pp. 33-49.
"Touchcom Interactive Videodisc Catalog Markets Furniture at Dayton's", *Videodisc & Optical Disk*, vol. 5, No. 5, Sep./Oct., 1985, pp. 343-345.

*Primary Examiner*—Jerry Smith
*Assistant Examiner*—David M. Huntley
*Attorney, Agent, or Firm*—Welsh & Katz, Ltd.

[57] ABSTRACT

A comprehensive inventory and sales control system is particularly adapted for the segment of the furniture industry that involves special order items, such as sofas, love seats, upholstered chairs and the like. The system is adapted to provide instant communications between retail establishments and a manufacturer, and enables the order to be confirmed at the time of purchase. This includes a determination of the availability of the fabric and reserving the item style and fabric from the manufacturer's stock, thereby enabling the manufacturer to determine and the customer to know the anticipated delivery date for the item that has been purchased. The system also enables a point of sale establishment to maintain a set of fabric swatches or samples of the fabrics that are currently available, thereby minimizing the possibility that a customer would order an item and a fabric that is not currently available. Additionally, the system also has the capability of updating the inventory of available fabrics and a plurality of fabric swatches at each establishment, and a means for scanning bar coded labels that are attached to the swatches, wherein the scanning means has sound producing means that permits quick and easy control of the inventory of swatches.

29 Claims, 15 Drawing Sheets

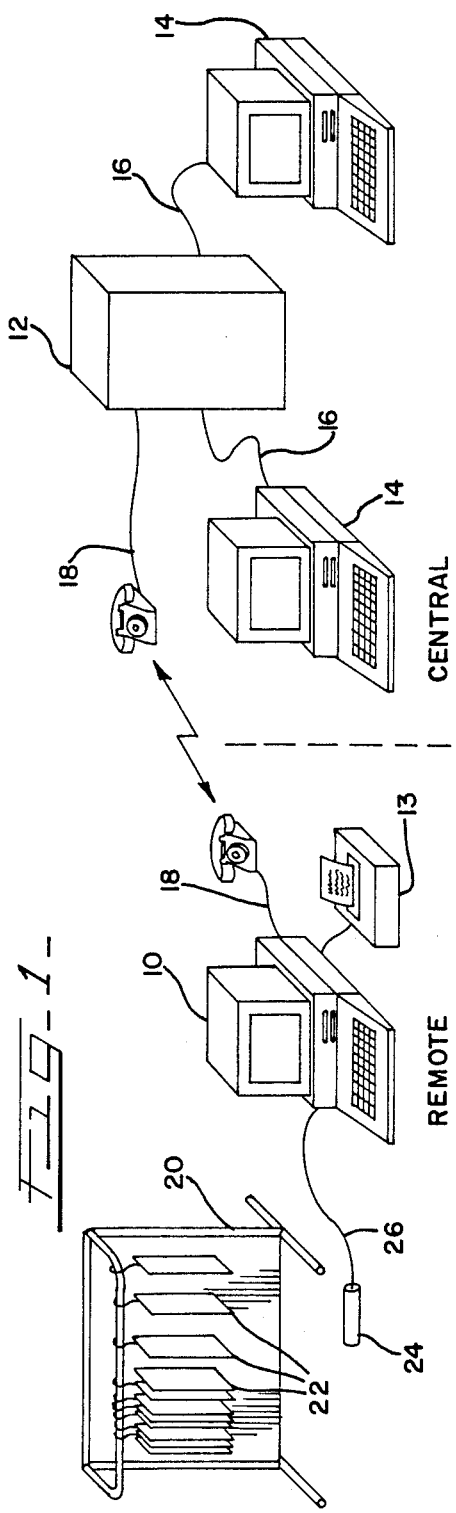

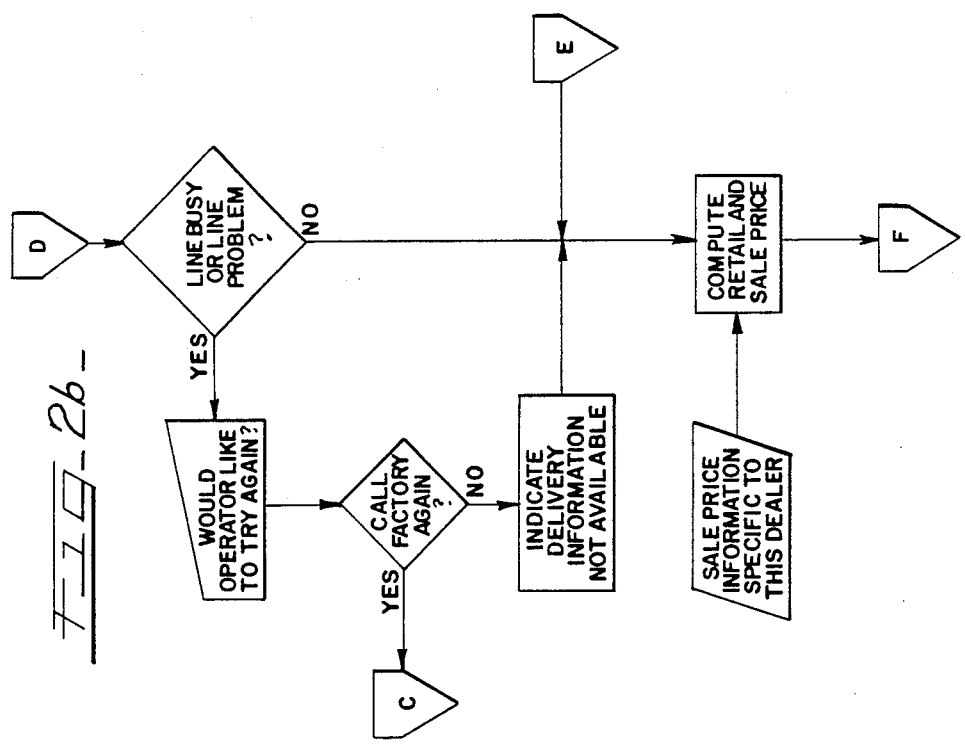
FIG_2b_
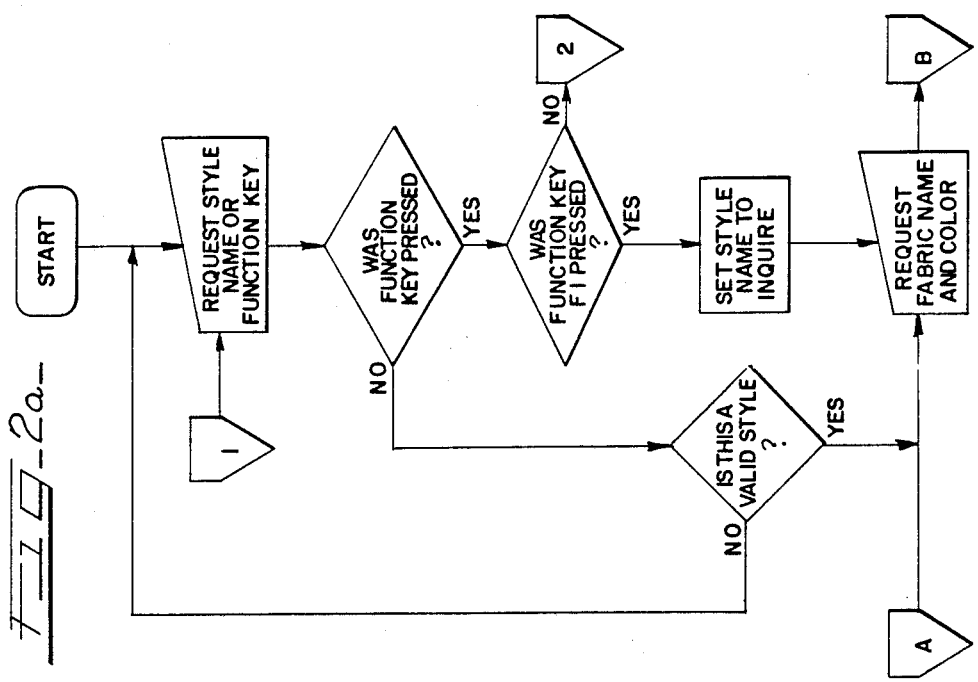
FIG_2a_

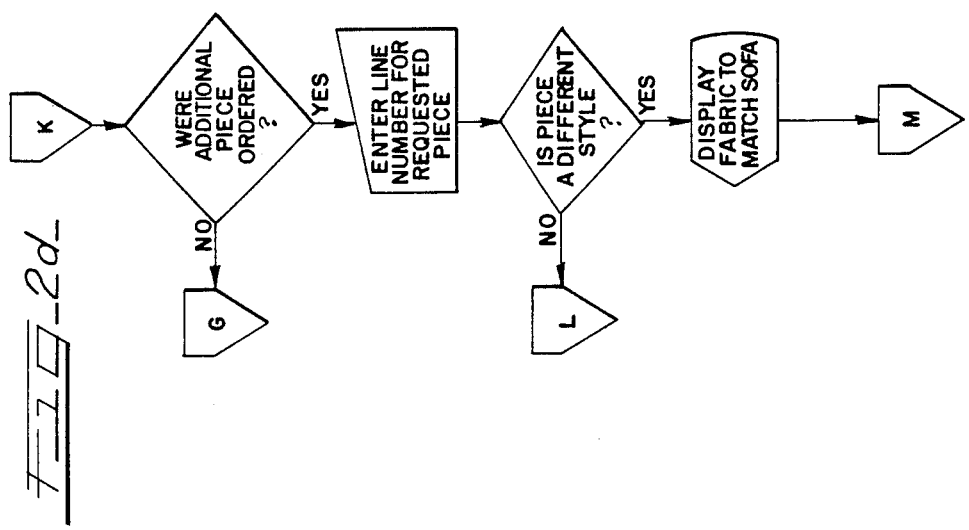
FIG_2d
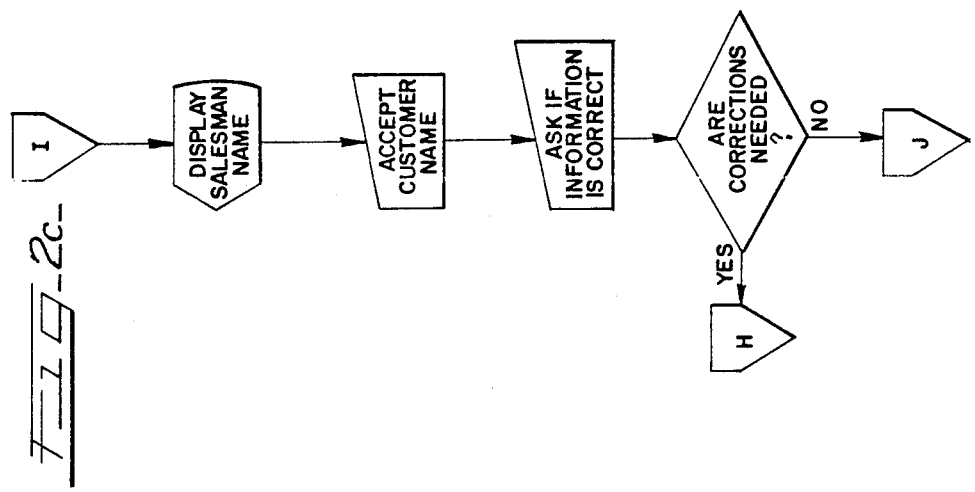
FIG_2c

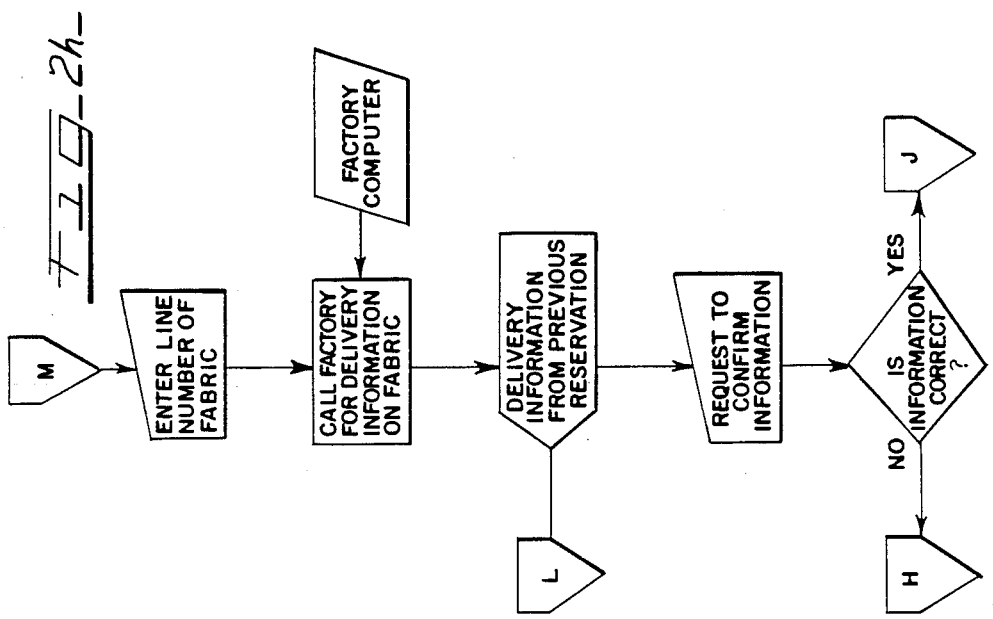
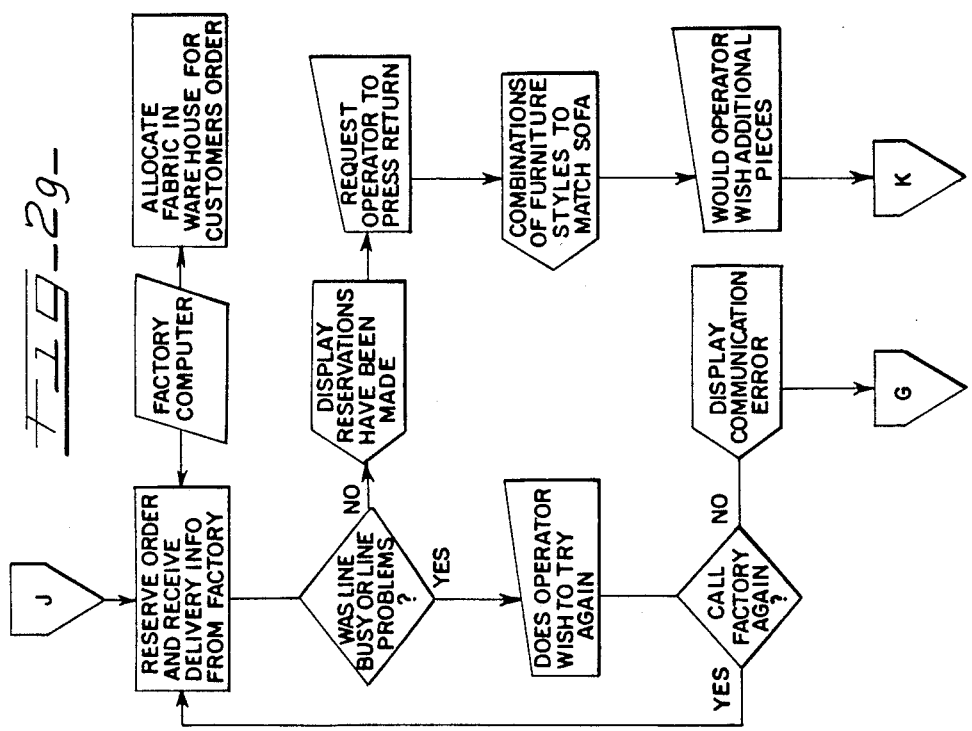

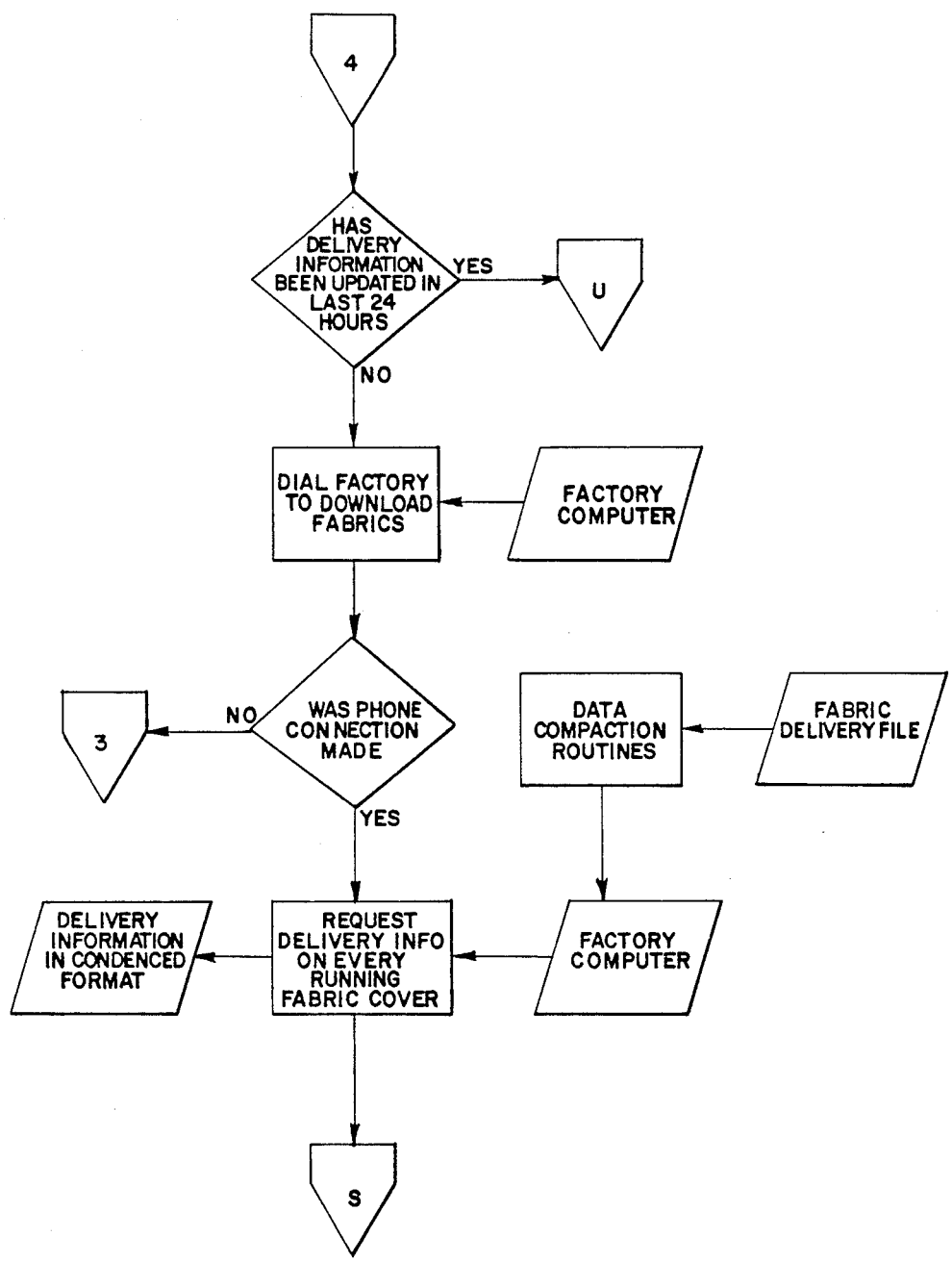
FIG-3a-

FIG_3f
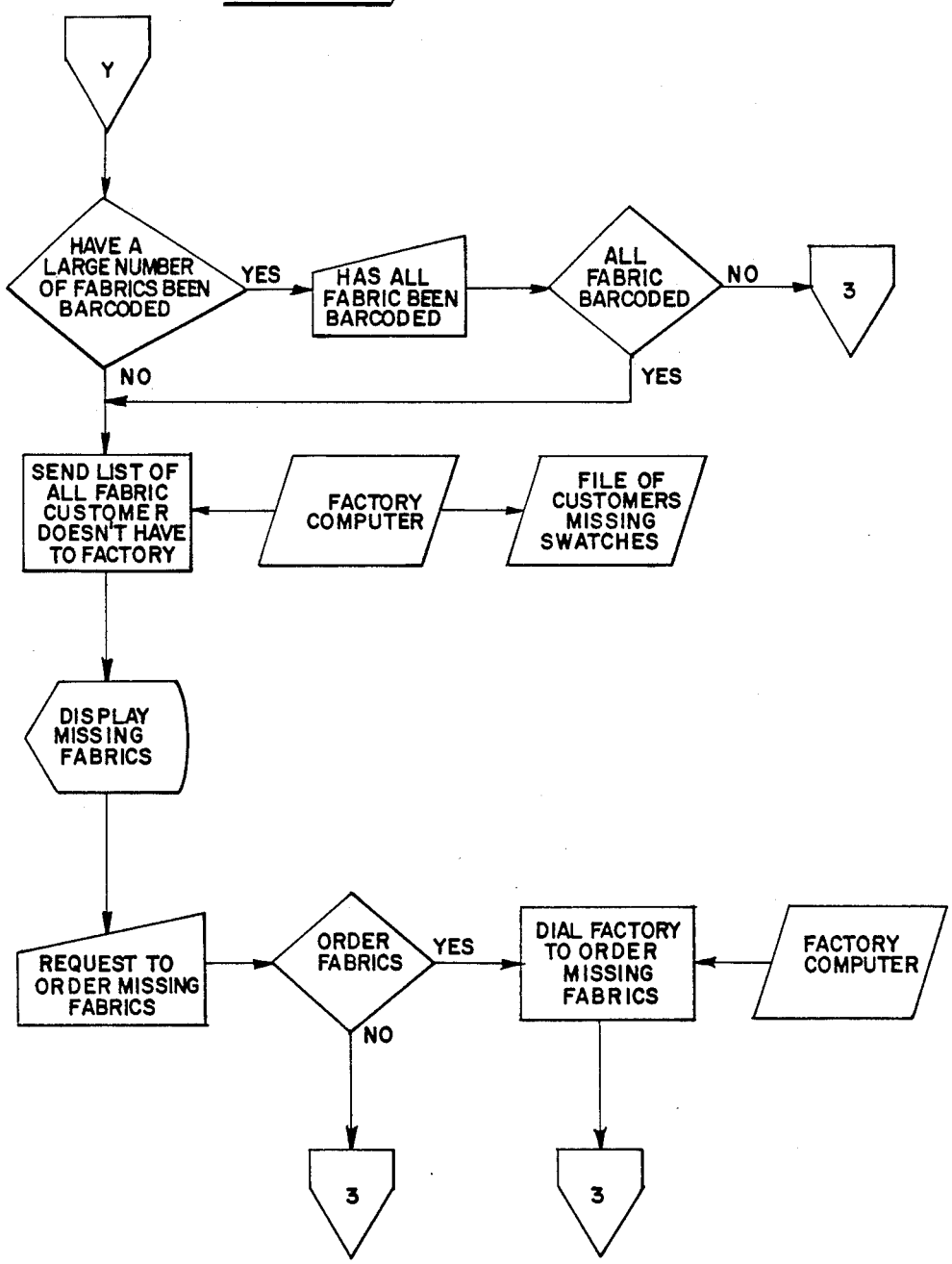

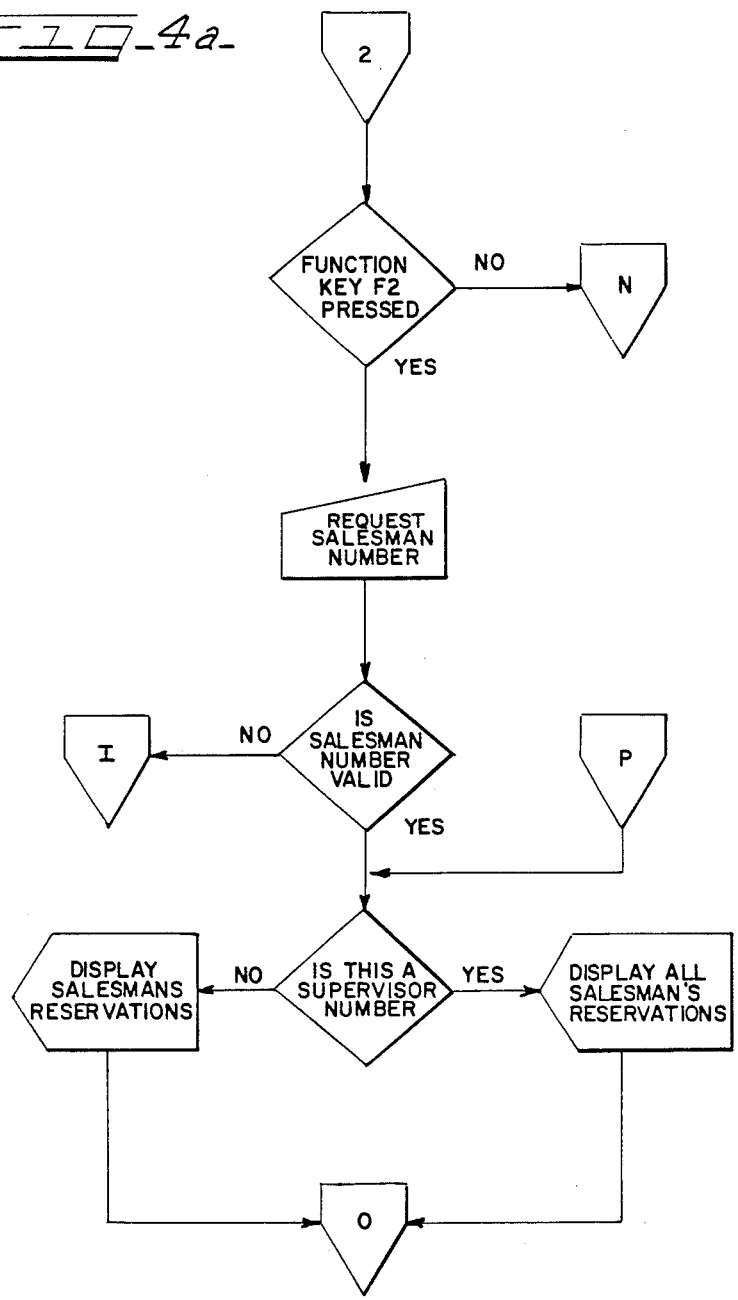
FIG_4a_

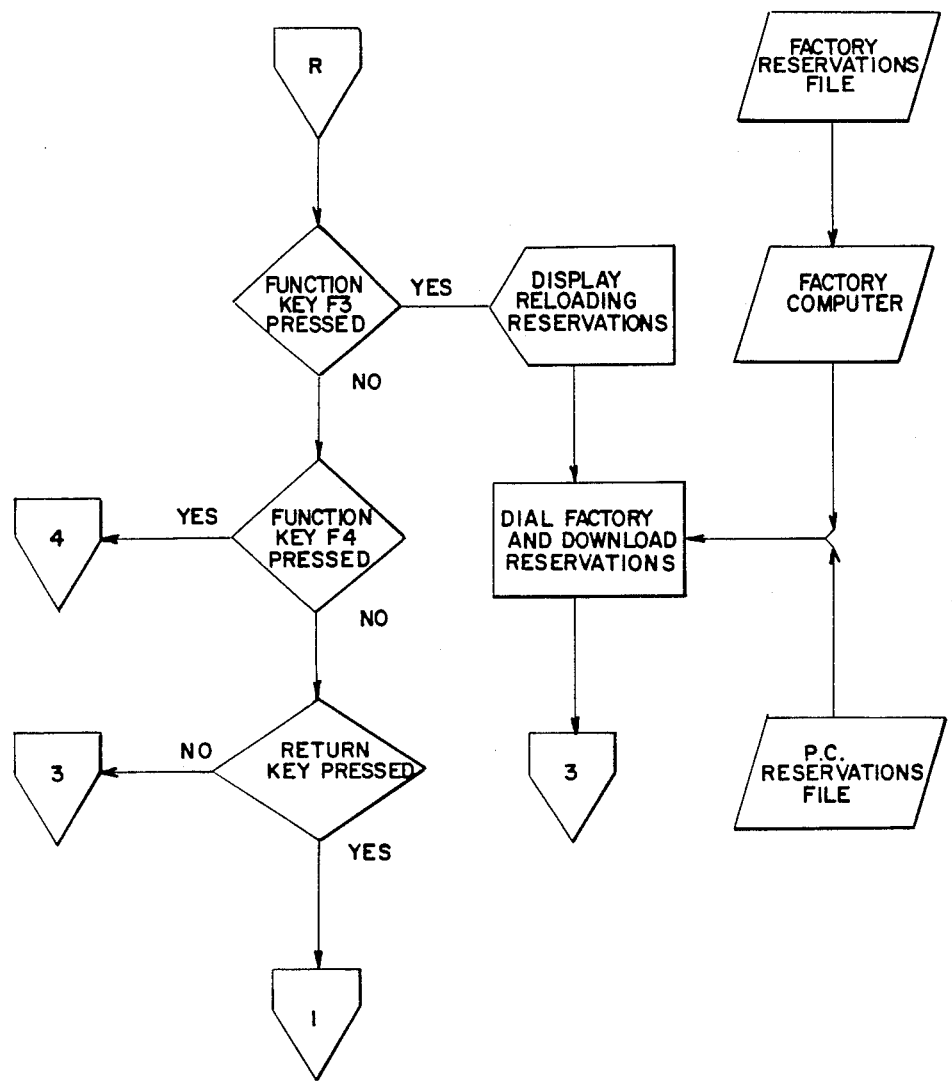
FIG-4e-

SALES AND INVENTORY CONTROL SYSTEM

The present invention generally relates to an inventory and sales control system, and more particularly relates to such a system for controlling sales activity and inventory of special order items between a plurality of remote locations and a central location.

While there have been numerous sales and inventory control systems that have been developed which utilize computers as an integral part of their operation, there continues to be a need for a comprehensive system that is particularly adapted for use in the sales and inventory of special order items that can be provided with many variables and different components. This is particularly the case for items which are marketed in many remote locations such as retail establishments in many different geographic locations where such items may be purchased. Communication between such retail establishments and a factory is essential to place orders, determine inventory of the items and the various components, determine expected time schedules for manufacturing the items and determine expected delivery dates.

A system that performs these functions can be used in many different industries and businesses, but is particularly useful in the furniture business. When retail purchasers wish to buy sofas, upholstered chairs and the like, it has often been necessary for the customer to pick out the basic style of the item, determine the fabric to be used, and various other alternatives, such as the type of skirts, quilting and the like. Generally, there are many more styles of items available, such as sofas, love seats and the like, than can be displayed on the floor of the retail establishment, but it often provides fabric samples and has one or more catalogues which identify the various items, types of alternatives that are available and the like.

After a customer picks out the item and selects the fabric and various alternatives, the order is typically sent to the factory by mail and the confirmation is subsequently received, and the item is then manufactured and ultimately delivered, often after a number of months. If it is subsequently realized that the fabric has been discontinued, or is otherwise unavailable, that realization may not be communicated to the retail establishment or the customer for weeks. When such events occur, the customer may often be upset and unhappy, which can result in loss of business for the retail establishment as well as the particular manufacturer. An overriding problem is that these kinds of problems often manifest themselves over a period of many weeks, which contributes to a customer's frustration.

Accordingly, it is an object of the present invention to provide an improved sales and inventory control system that is adapted to overcome many of the above described problems.

It is another object of the present invention to provide such an improved system which is adapted to provide instant communications between retail establishments and a manufacturer, and which enables the order to be confirmed at the time of purchase. This includes a determination of the availability of the fabric and reserving the item style and fabric from the manufacturer's stock, thereby enabling the manufacturer to determine and the customer to know the anticipated delivery date for the item that has been purchased.

Yet another object of the invention is to provide an improved system whereby the retail establishment can easily and accurately maintain a set of fabric swatches or samples of the fabrics that are currently available, thereby minimizing the possibility that a customer would order an item and a fabric that is not currently available.

A related object is to provide an improved system that has the capability of updating the inventory of available fabrics and a plurality of fabric swatches at each retail establishment, and a means for scanning bar coded labels that are attached to the swatches, wherein the scanning means has sound producing means that permits quick and easy control of the inventory of swatches.

Still another object of the present invention is to provide such an improved system which utilizes a computing means at each remote location, and which can be downloaded with pricing and current inventory data from the central location at frequent times.

A general object of the present invention is to provide such an improved system that promotes consumer satisfaction because of the capability of communicating with the factory to learn of actual availability of items and fabrics and to immediately obtain confirmation of orders; that promotes retailer credibility and profitability because of the capabilities of the system.

These and other objects and advantages will become apparent upon reading the ensuing specification, while referring to the attached drawings, in which:

FIG. 1 is a schematic diagram of representative hardware of the system of the present invention;

Figure 4D:
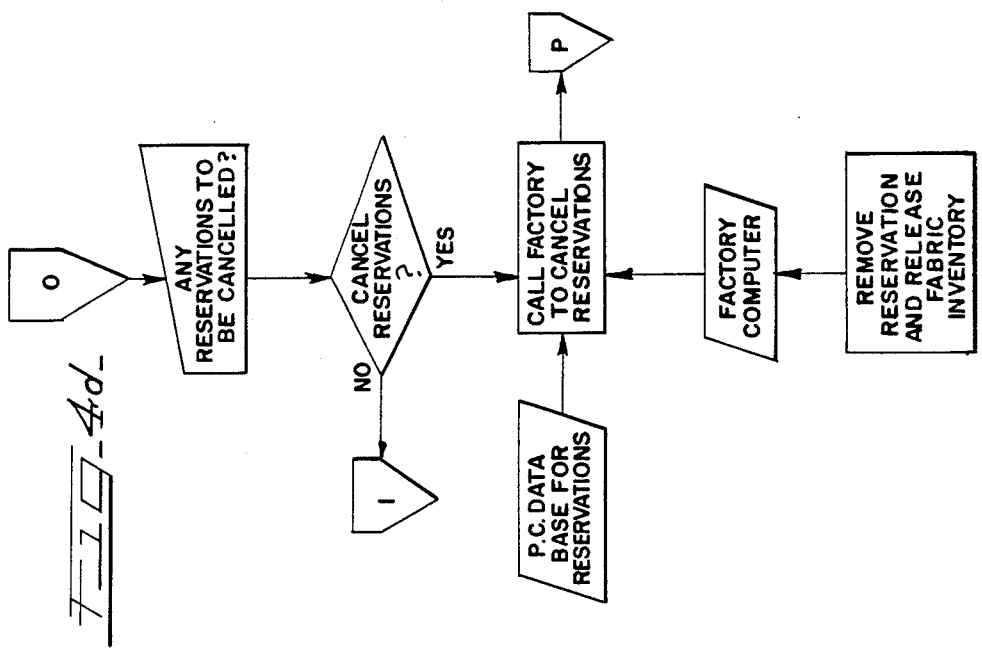
Figure 4C:
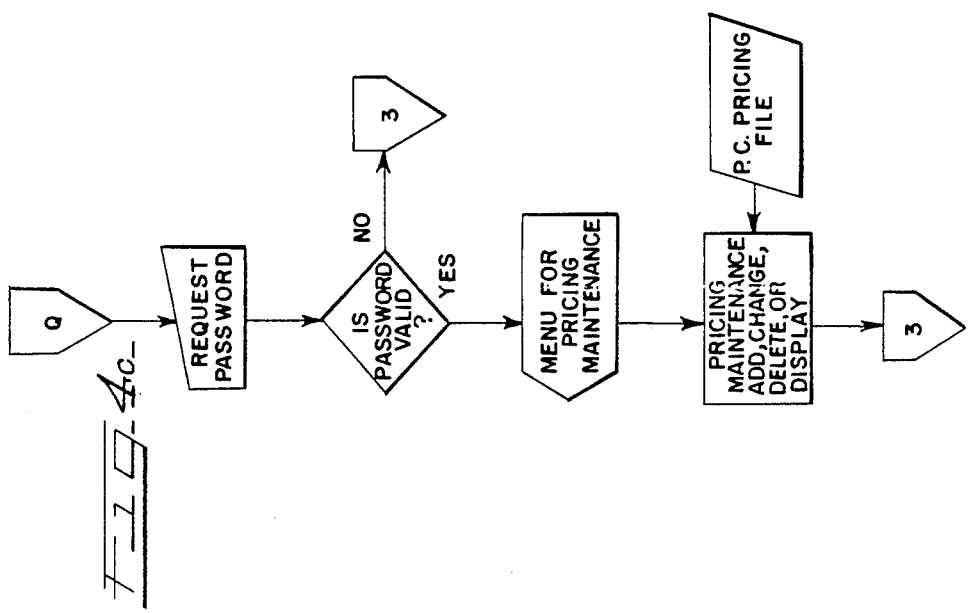

FIG. 3 illustrates a map of FIGS. 3a through 3f, which together comprise a flow chart of instructions, including those that relate to the control of the inventory of fabric swatches at the remote location; and, FIG. 4 illustrates a map of FIGS. 4a through 4e, which together comprise a flow chart of instructions that relate to the operation of the computer means in its various modes at each remote location.

DETAILED DESCRIPTION

Broadly stated, the present invention relates to a comprehensive inventory and sales control system that is particularly adapted for the furniture industry, particularly the segment of the furniture industry that involves special order items, such as sofas, love seats, upholstered chairs and the like. Such items are often special ordered by a customer to achieve a particular effect. In this regard, the basic style of a sofa must be determined, the fabric selected, and various alternatives such as skirt types and lengths, the presence or absence of pleats, quilting and the like. All of these factors are important to the style and appearance of the sofa or other item, and because of the many possible combinations that are available, a very large number of alternatives exist. Obviously, all of such combinations cannot be displayed, even in the largest retail establishment.

While the present invention provides a system for use in the furniture industry, it should be readily appreciated that it is conducive for use in many other industries, where a large inventory of all possible products cannot be maintained at any particular location, whether at the retail location or at a wholesale or distributor location.

The system of the present invention offers many advantages in terms of providing current information between any retail or point of sale locations on the one hand, and a factory on the other hand. By providing current information concerning availability of basic styles of items, availability of fabrics, pricing information, current status of backlogs and the like, the expected delivery dates for an item, if ordered, can be determined and be communicated to a potential purchaser at the time the purchaser is considering the purchase. If the customer decides to order an item, based on informed judgment, the order can be immediately entered and thereby placed in line. The basic style of the item as well as the fabric can be reserved and the item can thereafter be manufactured and delivered in an orderly and timely manner.

The system employs a main or central computing means (hereinafter referred to as the "central computer") at the factory and remote computing means (hereinafter referred to as "remote computer[s]") at the point of sale locations, and the central and remote computers each contain data bases which include the availability of items and fabrics, the pricing structure of the items, fabrics, and other alternatives, a hierarchical structure of management and sales personnel that are authorized to perform selected operations on the system. While the data bases for the central computer and the remote computers are not coextensive, for the central computer must contain order, manufacturing and other scheduling information for all orders that are entered from all of the remote locations, the remote computers preferably contain current pricing information for all items, fabrics and alternatives. The extent of the information contained in the central and remote computer data bases will be more fully described as the details of the system are described herein.

As a result of the interaction between the various remote computers and the central computer, the central computer can utilize all of the orders that are received from across the entire geographical regions that are served, and systematically analyize and assemble the ordering information for distribution to the remote computers, thereby informing the various retail establishments about which styles and fabrics are selling the best, receiving the most inquiries and the like. With this information, the retail establishments can order floor samples that have a significantly improved chance of being rapidly sold, which should improve the profitability of the furniture line in that establishment.

Turning now to the drawings, FIG. 1 illustrates a schematic diagram of the components of the system and shows a representative remote computer 10 that would be present at a point of sale location, such as a retail furniture establishment, and a central computer 12 that is preferably located at the factory of a furniture manufacturer. The remote computers are preferably personal computers that utilize the well known MS/DOS operating system, and each has a display, a keyboard, an internal memory and a modem for communicating with the central computer. An associated printer 13 is preferably provided. The central computer 12 may have a number of terminals 14, only two of which are shown, that are connected to the central computer 14 and are available for operation by the manufacturer's sales processing staff, the manufacturing personnel and others. The central computer is preferably hardwired to the terminals 14 via dedicated lines 16, but these terminals may be connected by telephone lines through modems if desired. The remote computers 10 may be located in furniture establishments in many geographical locations and they are preferably connected to the central computer via telephonic communications (lines 18) via modems preferably located in the central computer and each remote computer.

At the retail or point of sale location, the remote computer is preferably placed in a conspicuous location where potential customers can see it and the sales personnel can use it with the customers. The remote computing means is preferably in the immediate vicinity of representative items, which in the furniture industry, preferably comprises a number of sofas, love seats, upholstered chairs or the like. There is preferably a display of samples or swatches of available fabrics that may be chosen for an item of furniture that can be ordered. A freestanding display 20 is shown in FIG. 1 and contains a large number of swatches 22, which are removably hung from the display. In an actual display, there may be several hundred to a thousand or more of such swatches 22 available at each point of sale location.

In accordance with an important aspect of the present invention, the remote computer 10 preferably has a bar code reader 24 connected thereto by a cable 26. Each of the swatches preferably has a bar code label attached to the back thereof, and the labels can be read by the reader 24 at appropriate times to update the fabric swatch inventory. The manner in which this is done greatly facilitates easy and convenient control of the fabrics that are available to customers who wish to order furniture items. In this regard, one of the significant problems in special ordering items of furniture relates to the availability of fabrics for an item. While fabric swatches are generally provided by furniture manufacturers for furniture stores and other retail establishments, they often do not reflect which fabrics are actually currently available. It is a source of frustration for a customer to special order an item of furniture with a particular fabric, and then find out, often weeks later, that the item cannot be supplied with the chosen fabric on a timely basis, if at all.

In the present system, the central computer maintains a current inventory of available fabrics, preferably including the quantities of each available fabric, so that when an order is received, the requisite amount of the chosen fabric can be reserved for that order, and the quantity of available fabric is then updated. Also, the identities of the currently available fabrics are downloaded to the remote computers so that each point of sale location has the latest up to date availability.

The system also uses this information in an additional significant way. As the listing of available fabrics is communicated to each remote computer, personnel at the point of sale location use the bar code reader to read each of the labels of the fabric swatches, and as a result of the reading, enable them to remove swatches from the display for those fabrics that are not available or are discontinued, and replace swatches on the display for those fabrics that are again available. The system is designed to accomplish this updating of the swatches easily and rapidly, so that it can be done on a frequent basis, i.e., weekly or even daily.

The rapid and easy updating swatches is facilitated by having the system generate unique sounds and screen displays upon reading a swatch label by the bar code reader, depending upon the status of the availability of the fabric at the particular time. More specifically, as an operator reads each of the labels of the fabric swatches with the bar code reader 24, a sound is emitted and an indication on the screen is displayed which indicates whether the fabric is available or not. If the fabric is an available fabric, then a "beep" sound, for example, is emitted. If the fabric is temporarily unavailable, then a short "beep" followed by a longer "beep" sound, for example, may be emitted. If the fabric has been discontinued, then a long "beep" followed by a short "beep" sound may be emitted. It is important to realize that the particular sounds that are used are not critical, only that a distinctive sound be produced so that the status can be determined while the reading is being carried out. Thus, as an operator scans the label of each swatch, one of the possible sounds are emitted, and the operator can react accordingly. The remote computer screen also provides a visual indication of the status of the availability of the fabric. However, as may be appreciated, the reading of the swatches may be done using a bar code reader having a long cord, and the display screen may not be visible. The operator need not view the screen, but may merely rely on the distinctive sounds that are emitted by the system.

If the operator is scanning the swatches that are present on the display rack, and the reading of a swatch results in a sound that is indicative that it is available, then it is kept on the display. If the reading produces an indication that the fabric is unavailable, then the swatch is removed and thrown in a container or otherwise placed out of view of prospective purchasers. If the reading produces an indication that the fabric has been discontinued, then the swatch can be permanently disposed of. At the same time that labels of the swatches that are on display to the customers are read, the collection of swatches that have been previously temporarily removed should also be read to determine if they are again available, and if the indication is to that effect, then those swatches can again be placed on the display. In this manner, only the current swatches are placed on display, and the customers can select those fabrics that are available, at least from the time of the most recent inventory updating. It should be recalled that the availability of each fabric can be confirmed from the factory at the time an order is being placed.

While the preferred embodiment utilizes three distinctive sounds to indicate that a fabric is available, temporarily unavailable or discontinued, it should be understood that only two distinctive sounds may be used to accomplish the primary goals of maintaining current fabrics on display. In this regard, one distinctive sound may indicate fabric availability, while another distinctive sound may indicate fabric unavailability or discontinuance. When it is considered that many furniture manufacturers may have a thousand or more fabric choices, and the swatches of available fabrics that are on display may number approximately seven hundred, the inventory of fabric swatches that are preferably maintained in a back room may easily number several hundred or more.

By having an employee scan or read the labels of the swatches on display and in the back room, the swatches can either be removed or replaced as indicated. Since it can be done by merely scanning each swatch, while listening for the distinctive sound, the employee can merely remove it from the display if it is unavailable or discontinued, or it the scanning is being done on the swatches that are not on display, separating those swatches from the others if they are to be returned to the display, and then replacing those swatches to the display. Since each reading only takes a few seconds, several hundred swatches can be scanned and appropriately dealt with in a relatively short amount of time.

An additional advantage results from an employee reading all swatches in its establishment. After all swatches have been read, the remote computer then has a listing of all swatches which can be compared with the list in the central computer. If swatches are indicated in the central computer that have not been scanned by the remote computer, and are available, the remote location will be provided with the identities of the swatches that are missing, and the establishment having the remote computer can then order the hissing swathes if it desires to do so. In this way, the point of sale establishments can maintain a current inventory of available swatches. The system is designed to provide display screens on the remote computer that guide the sales personnel through the steps that are required to make an inquiry, determine the availability of items and fabrics, and to place an order. When the remote computer is placed into operation, the initial screen that is displayed is the following:

| ELECTRONIC SPECIAL ORDER GALLERY FOR YOUR FURNITURE STORE | | |
| --- | --- | --- |
| STYLE NUMBER | FABRIC NAME | FABRIC COLOR |
| ......... | | |
| F1 FABRIC INQUIRE | F2 RESERVATIONS INQUIRE | |
| F3 OPTIONAL MENUS | | |
| MAIN MENU | | |

As the screen indicates, a style number, fabric name and fabric color is entered by typing the same. By depressing the appropriate function key, an inquiry of the fabric can be performed, specifically the F1 key, or an inquiry for a reservation of the item and fabric by depressing the F2 key. Depressing the F3 function key prompts the optional menus, which will be subsequently described.

To place an order, the following steps are followed, which enables the user to view and place orders, obtain delivery, availability and pricing information for style and fabric combinations. The user must enter the five to eight numeric digit style number desired and press ENTER. If entered incorrectly, i.e., additional spaces, transposition, etc., the screen will refresh with a blank line to try again. If entered correctly, the system will bring up a blank line for fabric name entry. The user then enters the name or appropriate abbreviation for the fabric desired and presses ENTER. Upper or lower case letters or a combination of each may be used. If unknown, the Fabric Search Option may be utilized. If entered incorrectly, i.e., misspelled, the system will automatically go into the Fabric Search Option. If entered correctly, the system will bring up a blank line for fabric color entry. The user then enters the fabric color name or appropriate abbreviation and presses ENTER. If unknown, the Fabric Search Option may be utilized. If entered incorrectly, i.e., misspelled, the system will automatically continue into the Fabric Search Option. If entered correctly, the system will call the factory for availability, pricing, and delivery information.

It should be understood that the bar code reader may also be used to enter the fabric name and color that is encoded on the bar code label located on the back of the swatch. This can be done by merely passing the bar code reader over the bar code on the appropriate fabric label. The user should check the style number, fabric name, and color to ensure they are what are desired. Current retail and sale pricing is given specifically for the point of sale establishment. The system then prompts, "Do you wish to place and order to be confirmed by P.O. (Y or N)?" The user then enters either a Y for yes or an N for no to place an order for the item. Orders are preferably followed by a purchase order to the factory as soon as possible. If an N or no character is entered, the system will refresh back to the Main Menu with no action taken. If a Y is entered, the system asks for the Store Salesperson's access code and customer name. The user then enters the salesperson's code and presses ENTER. The user then enters the customer's name and presses ENTER. The system then prompts "Is the information above correct (Y or N)?" If an N is entered, the ENTER key must be entered twice. The system will then return to the step which allows entry of the correct information or exit to the Main Menu. If a Y is entered, the system places and confirms the order with the factory and responds with an appropriate message, and the user then presses ENTER. A menu listing coordinating pieces which are available along with corresponding retail and sale pricing is shown. The system prompts, "Would you like to order an additional piece listed above (Y or N)?" If an N is entered, the system returns to the Main Menu. If a Y is entered, the system prompts, "Enter number desired style is on." A menu listing possible coordinating piece selection along with pricing and delivery information is shown. The order process can be then continued as described above, or it can be ended by answering N to the prompts.

The following screen will then be displayed:

| ELECTRONIC SPECIAL ORDER GALLERY FOR YOUR FURNITURE STORE | | |
|---|---|---|
| STYLE NUMER | FABRIC NAME | FABRIC COLOR |
| 87-510 | CANDY | MAUVE |
| YOUR ORDER CAN BE DELIVERED IN THE WEEK OF 12/31. WE ALSO HAVE STOCK FOR A LOVESEAT AND TWO MATCHING CHAIRS. | | |
| RETAIL PRICE | 756.43 | |
| SALE PRICE | 540.40 | |
| DO YOU WISH TO PLACE AN ORDER TO BE CONFIRMED BY P.O. (Y or N) | | |
| STORE SALESMAN CODE | CUSTOMER NAME | |
| BOB GOODWIND | JOE BUYER | |
| IS THE INFORMATION ABOVE CORRECT (Y or N) | | |
| ORDER ENTRY SCREEN | | |

After this screen is displayed, the store sales person is asked to supply that person's code, which results in the person's identity being displayed. The salesperson then enters the name of the customer, and then the screen displays the indication that the order for the customer is now in the system.

A fabric search option is provided to enable the user to peruse an alphabetically arranged list of fabric and color combinations from which a choice may be made. At the Main Menu following either entry of the appropriate style number or entry into the Fabric Inquire Option, the first letter of the fabric name may be depressed, and a complete list of available colors for the fabric name will be displayed upon pressing ENTER. Also, two letters may be entered to display potential combinations from different points in the list. After pressing ENTER, the system brings up a line for color choice. Any letter may be entered as it does not affect this option. The system then displays a list of potential fabric and color combinations for your choice. To view additional screens, the ENTER key may simply be depressed. To choose a displayed combination, the item number and ENTER are each depressed. The system then returns to the Main Menu with the combination choice automatically entered. The above are accomplished with a screen similar to the following example:

| ELECTRONIC FABRIC SEARCH | |
|---|---|
| 1. BALLET BLUESTONE | 9. BERKSHIRE GREEN |
| 2. BALLET QUARTZ | 10. BERKSHIRE MAUVE |
| 3. BATIK HEMP | 11. BERKSHIRE ROSE |
| 4. BAUBLE CREAM | 12. BERKSHIRE SUNRISE |
| 5. BAUBLE OLD ROSE | 13. BERMUDA SMOKE |
| 6. BEIJING BLUE | 14. BERWYN PASTEL |
| 7. BELLONA JADE | 15. BLAINE BLUE |
| 8. BERKSHIRE CREAM | 16. BLAINE SAGE |
| | 17. BOMBAY BLACK |
| SELECT FABRIC — PRESS RETURN FOR MORE | |
| FABRIC SEARCH OPTION SCREEN | |

All system functions originate from the Main Menu and are entered by way of pressing the appropriate function key. The prompt line displayed at the bottom of the Main Menu screen indicates functions available along with the appropriate function keys.

In accordance with an aspect of the present invention, the user can inquire about style availability, delivery, and pricing of fabric and color combinations. This can be accomplished by the procedure of pressing the F1 key to enter the Fabric Inquire function. The name or appropriate abbreviation for the fabric desired is typed and ENTER is pressed. If unknown, the fabric Search Option that has been previously described may be utilized. If entered incorrectly, i.e., misspelled, the system will automatically go into the Fabric Search Option. If entered correctly, the system will bring up a blank line for fabric color entry. The fabric color name or appropriate abbreviation is then typed and ENTER pressed. If unknown, the Fabric Search Option may again be utilized. If entered incorrectly, i.e., misspelled, the system will automatically continue into the Fabric Search Option. If entered correctly, the system will call the factory for availability, pricing, and delivery information. The fabric name and color may be automatically entered by passing the bar code reader over the bar code on the appropriate fabric label. The fabric name and color should be checked to ensure that the correct information is being requested. Current retail and sale pricing is given specifically for the point of sale establishment that originates the inquiry. The availability and delivery information is given for the fabric and color selected. The following screen is produced:

| ELECTRONIC SPECIAL ORDER GALLERY FOR YOUR FURNITURE STORE | | |
|---|---|---|
| STYLE NUMBER | FABRIC NAME | FABRIC COLOR |
| INQUIRE | CANDY | MAUVE |
| YOUR ORDER CAN BE DELIVERED IN THE WEEK OF 12/31 | | |
| RETAIL PRICE | 26.00 PER YARD PLAIN | |
| RETAIL PRICE | 36.00 PER YARD QUILTED | |
| FABRIC INQUIRE FUNCTION SCREEN | | |

A reservations inquire function is provided to enable the user to view and cancel currently reserved items. This is accomplished by pressing the F2 function key. The system prompts for entry of the user's access code. The user's entry code is then typed and the ENTER key pressed. The system brings up a screen displaying all of the user's currently reserved items if the salesperson has previously been given at least an authority level zero. If the user is a supervisor with authority level three, all currently reserved items for the entire establishment are shown. The system prompts, "Do you wish to cancel any reserved items?" If an N or no character is entered, the system returns to the Main Menu. If a Y is entered, the system prompts, "Enter selection number to cancel." The item number that is desired to cancel is then typed. The system calls the factory computer and prompts, "Item has been cancelled, press ENTER to continue." If none, press ENTER to return to the Main Menu. The following screen is generated:

| CURRENT RESERVED INFORMATION | | BOB GOODWIND | |
|---|---|---|---|
| 87-510 | CANDY MAUVE | JOE BUYER | BOB GOODWIND |
| | 5/4/87 | | 13:51 004 |
| DO YOU WISH TO CANCEL ANY RESERVED ITEMS? | | | |
| ENTER SELECTION NUMBER TO CANCEL | | | |

In accordance with another aspect of the present invention, the system provides a screen display which enables various maintenance functions to be performed at the remote computer to enable the user to enter the system options, such as entering new employees authorized to operate the system, deleting employees, changing pricing structures and the like. The procedure is to press the F3 function key to enter the Optional Menus function. The system prompts for the user to enter their access code. However, it is preferred that the system be structured so that a supervisor with authority level three be required to access the system options. The access code is then typed and the ENTER key pressed. The system brings up a menu displaying four different options available for use, as shown by the following screen:

| RESERVATIONS INQUIRE FUNCTION SCREEN |
|---|
| ELECTRONIC SPECIAL ORDER GALLERY |
| FOR YOUR FURNITURE STORE |
| PLEASE SELECT |
| F1 EMPLOYEE MAINTENANCE |
| F2 PRICING MAINTENANCE |
| F3 RELOAD RESERVATIONS |
| F4 BARCODE FABRIC SWATCHES |
| RETURN KEY EXIT THIS MENU |
| OPTIONAL MENUS FUNCTION MENU |
| SHOWS OPTIONS AVAILABLE |

When the above screen is produced, the user can select any of the options to accomplish the desired task, which will be individually described.

With respect to the employee maintenance option, it enables a user to add, change or inquire, delete or display the authorized users of the system. To accomplish any of these tasks, the user presses F1 to enter the Employee Maintenance option. The system prompts the user to enter the system password. The user then enters the system password and presses ENTER. The system displays a menu with four different items available for use, as shown by the following screen.

| EMPLOYEE FILE MAINTENANCE |
|---|
| PLEASE SELECT FUNCTION KEY |
| F1 ADD EMPLOYEES |
| F2 CHANGE/INQUIRE EMPLOYEES |
| F3 DELETE EMPLOYEES |
| F4 DISPLAY EMPLOYEES |
| RETURN KEY EXIT THIS MENU |
| EMPLOYEE MAINTENANCE OPTION MENU |
| SHOWS EMPLOYEE FILE MAINTENANCE ITEMS |
| AVAILABLE |

To add authorized system users, the procedure is to press the F1 function key to enter the Add Employees mode. The system displays a screen for assignment of the employee's unique numeric access code. The desired access code consisting of up to four numeric digits is typed, and ENTER pressed. The system prevents duplication of codes by non-acceptance and display of an "Employee Code Already Used" prompt. A blank line for name entry is displayed, and the employee's name is then typed and ENTER pressed. A blank for authority level is displayed. A zero is entered for a salesperson or a three for a supervisor and ENTER is then pressed. The system prompts, "Item number to change?" If an error was made in entry of the name or level, the item number is typed and the appropriate correction is made. The employee access code cannot be changed while in this mode. Upon pressing ENTER, the information is recorded and the system screen is again ready for the next employee to be added. If none, ENTER can again be pressed to return to the Employee Maintenance Option menu. This mode has the following accompanying screen:

| EMPLOYEE FILE MAINTENANCE |
|---|
| ADD |
| 1 EMPLOYEE NO. |
| 2 NAME |
| 3 LEVEL |
| ADD EMPLOYEES ITEM SCREEN |

To enable the user to change or inquire about the authorized system users, the F2 function key is pressed. The desired employee's access code is typed and ENTER pressed. The corresponding employee name and authority level are displayed. The system prompts, "Item Number to Change?" The item number of the desired employee to change is typed and the appropriate alterations are then made. The access code cannot be changed while in this mode. After pressing ENTER, the new information is recorded and the system screen is again ready for the next inquiry or change. If none, ENTER should again be pressed to return to the Employee Maintenance Option menu. The following screen is produced during this mode which illustrates the procedure:

| EMPLOYEE FILE MAINTENANCE | |
|---|---|
| CHANGE/INQUIRE | |
| 1 EMPLOYEE NO. | 1000 |
| 2 NAME | BOB GOODWIND |
| 3 LEVEL | 3 |
| ITEM NUMBER TO CHANGE? | |
| CHANGE/INQUIRE EMPLOYEES ITEM SCREEN | |

To enable the user to delete employees no longer authorized access to the system, the function F3 key is pressed, and the desired employee's access code is typed and ENTER pressed. The corresponding employee name and authority level are automatically displayed. The system prompts, "Is this the employee to be deleted (Y or N)?". If a N or no character is entered, the system will respond "Not Processed." The user must press ENTER. The system screen is again ready for the deletion of an employee. If none, ENTER must be pressed again to return to the Employee Maintenance Option menu. If a Y is entered, the employee is deleted from the system. The system screen is again ready for the deletion of another employee. If none, ENTER must again be pressed to return to the Employee Maintenance Option menu. The following screen is displayed:

| EMPLOYEE FILE MAINTENANCE | |
| --- | --- |
| DELETE | |
| 1 EMPLOYEE NO. | 1000 |
| 2 NAME | BOB GOODWIND |
| 3 LEVEL | 3 |
| IS THIS THE EMPLOYEE TO BE DELETED (Y or N) | |
| DELETE EMPLOYEES ITEM SCREEN | |

To enable the user to view a list of employees and their corresponding information that are allowed access to the system the procedure is to press F4 to enter the Display Employees mode. All employees authorized access to the system are displayed along with their access code and authority level. No changes may be made while in this mode. ENTER must be pressed to return to the Employee Maintenance Option menu. ENTER must be pressed again to return to the Optional Menus Function menu. The following screen is produced:

| EMPLOYEE FILE MAINTENANCE | | |
| --- | --- | --- |
| DISPLAY EMPLOYEES | | |
| NO | EMPLOYEE NAME | LEVEL |
| 1000 | BOB GOODWIND | 3 |
| 2000 | JOHN NICELY | 0 |
| PRESS RETURN TO CONTINUE | | |
| DISPLAY EMPLOYEES ITEM SCREEN | | |

In accordance with another important aspect of the present invention, the product identification and pricing structure can be determined for items that are for sale and this option allows the user to add, change or inquire, delete or display group information contained in the system. To enter this mode of operation, the F2 function key is pressed, which results in a system prompt which requires entry of the system password. After the system password is entered, a menu with four different modes is displayed and are available for use. The following screen is displayed:

| GALLERY PRICING MAINTENANCE |
| --- |
| PLEASE SELECT |
| F1 ADD GALLERY GROUPS |
| F2 CHANGE/INQUIRE GROUPS |
| F3 DELETE GROUPS |
| F4 DISPLAY GROUPS |
| RETURN KEY EXIT THIS MENU |
| PRICING MAINTENANCE OPTION MENU |
| SHOWS GALLERY PRICING MAINTENANCE ITEMS |

| GALLERY PRICING MAINTENANCE |
| --- |
| PLEASE SELECT |
| AVAILABLE |

To add groups and their corresponding information to the system, the function F1 key is pressed to enter the Add Gallery Groups item. ENTER must then be pressed to return to the Pricing Maintenance option menu. The following screen is produced:

| GALLERY PRICING MAINTENANCE |
| --- |
| ADD GALLERY GROUPS |
| *. GROUP CODE |
| *. GROUP DESCRIPTION |
| 2. ADD ON RETAIL |
| 3. WHOLESALE MARKUP % |
| ADD GALLERY GROUPS ITEM SCREEN |

To enable the user to change/inquire current group information in the system, the procedure is to press F2 to enter the Change/Inquire Groups item. The user must then enter the one numeric digit group code desired for change/inquire and press ENTER. The corresponding description, add on retail, and wholesale markup are displayed. The system prompts, "Item number to change?" The group code and description cannot be changed by this function, but the add on retail and wholesale markup can. After changes are made, ENTER must be pressed. The new information is recorded and the system screen is again ready for the next change/inquire. If none, ENTER must be again pressed to return to the Pricing Maintenance Option menu. The following screen is displayed:

| GALLERY PRICING MAINTENANCE | |
| --- | --- |
| CHANGE/INQUIRE GROUPS | |
| *. GROUP CODE | 5 |
| *. DESCRIPTION | 2 PC SECT |
| 2. ADD ON RETAIL | 300.00+ |
| 3. WHOLESALE MARKUP % | 1.00+ |
| ITEM NUMBER TO CHANGE? | — |
| CHANGE/INQUIRE GROUPS ITEM SCREEN | |

To delete group information from the system, the procedure is to press the function F3 key to enter the Delete Groups item. The user must then enter the one numeric digit group code desired and press ENTER. The corresponding description, add on retail, and wholesale markup are displayed. The system prompts, "Is this the group to be deleted (Y or N)?" If an N or no character is entered, the system will respond "Not Processed." and the user must then press ENTER. The system screen is again ready for the deletion of a group. If none, the user must press ENTER again to return to the Pricing Maintenance Option menu. If a Y is entered, the group is deleted from the system. The system screen is again ready for the deletion of another group. If none, the user must press ENTER again to return to the Pricing Maintenance Option menu. The following screen is displayed:

| GALLERY PRICING MAINTENANCE | |
| --- | --- |
| DELETE | |
| *. GROUP CODE | 5 |
| *. DESCRIPTION | 2 PC SECT |

-continued

| GALLERY PRICING MAINTENANCE DELETE | |
| --- | --- |
| 2. ADD ON RETAIL | 300.00+ |
| 3. WHOLESALE MARKUP % | 1.00+ |
| IS THIS THE GROUP TO BE DELETED (Y or N) — | |
| DELETE GROUPS ITEM SCREEN | |

To view all current group information in the system, the procedure is to press the function F4 key to enter the Display Groups item. All current groups are displayed along with their add on retail and wholesale markup percentages. The user must then press ENTER to return to the Pricing Maintenance Option menu, and the user must press ENTER again to return to the Optional Menus Function menu. The system produces the following screen in performing this mode of operation:

| GALLERY PRICING MAINTENANCE DISPLAY GROUPS | | |
| --- | --- | --- |
| GROUP NUMBER AND NAME | ADD ON RETAIL | WHOLESALE MARKUP % |
| 1 SOFA | 200.00+ | 1.00+ |
| 2 LOVE SEAT | 150.00+ | 1.00+ |
| 3 CHAIR | | |
| 4 OTTOMAN | | |
| 5 2 PC SECT | 300.00+ | 1.00+ |
| 6 CONVERT | | |
| 7 MISC | | |
| 8 SECT ITEM | | |
| 9 CORNER | | |
| A INCLINER | | |
| B 3 PC SECT | | |
| C ARM END | | |
| D CONVERT | | |
| PRESS RETURN TO CONTINUE | | |
| DISPLAY GROUPS ITEM SCREEN | | |

To enable the user to ensure their system contains current reservations information, the procedure is to press F3 to enter the Reload Reservations option. Reservations are brought up to a current status automatically by the factory computer. The user must press ENTER to return to the Optional Menus Function menu.

In accordance with yet another important aspect of the present invention which has been previously partially described, the system enables the user to ensure current availability of fabric swatches on a periodic basis. It is preferred that this be accomplished once per week after the normal peak period. The procedure is to press the function F4 key to enter the Bar Code Fabric Swatches option. If this is the first time in a twenty-four hour period that the user has entered this option, the system will call the factory computer and update all fabric information. The user should then read the bar code of each fabric swatch or sample. There will be one brief beep following successful entry of each bar code label on each swatch. Yardage information is given on the screen although it is not necessary to continually view information. There will be an additional, longer beep following the short if the fabric is temporarily out of stock at the factory. The fabric swatch should be pulled if this is the case, and checked again each successive week or day during the bar coding process until it is again in stock. There will be a long beep followed by the short beep with a message if the fabric has been discontinued. The fabric swatch should be discarded if this is the case. The user must press ENTER when finished bar coding all fabric swatches on the display rack. The system prompts, "Do you wish to return to the Main Menu (Y or N)?" If an N or no character is entered, the system will accept additional swatch bar coding. If a Y is entered, the system will return to the Optional Menus Function Menu. The following screen is displayed on the remote computer:

| UPDATING FABRIC INFORMATION ENTER FABRIC NUMBER WITH BARCODER BAR CODE FABRIC SWATCHES OPTION SCREEN |
| --- |

The operation of the system of the present invention has been described in terms of the various modes that accomplish the desired tasks. The system operates in response to user instructions and issues prompts which provide the user the capability to carry out the intended tasks.

Figure 2E:
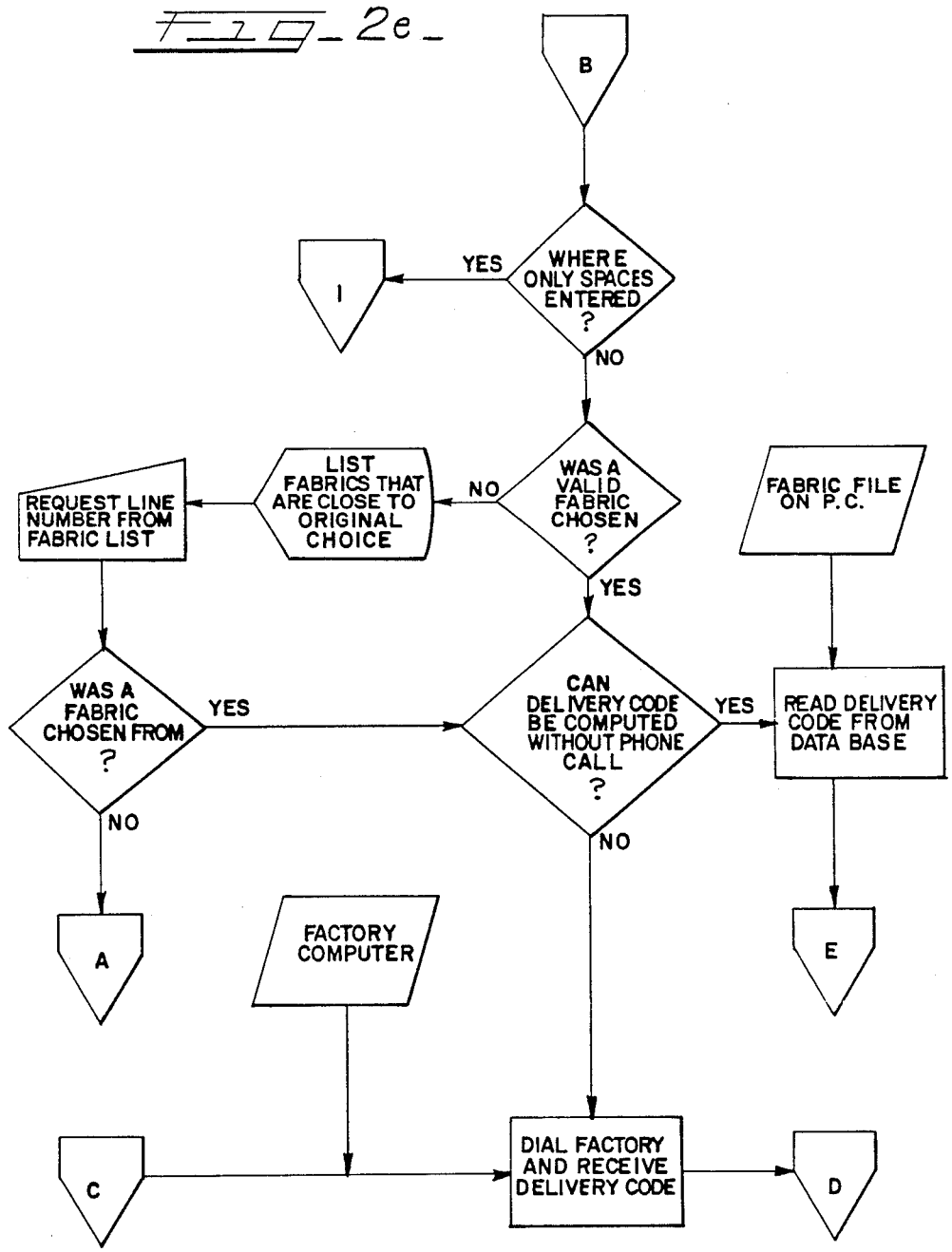
FIG. 2 illustrates a map of FIGS. 2a through 2h, which together comprise a flow chart of instructions that relate to sales procedures that occur at each remote location.
Figure 2F:
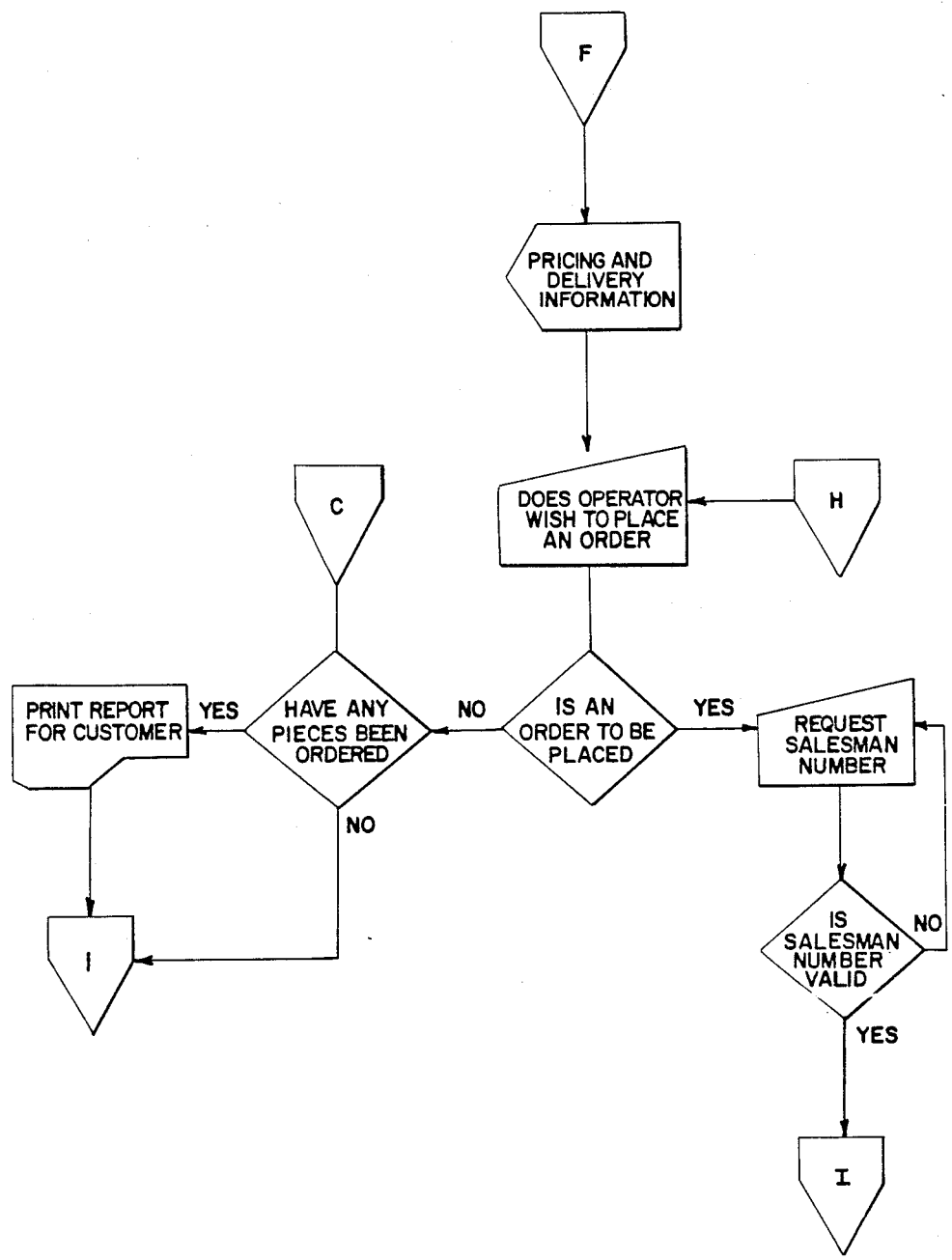
Figure 3B:
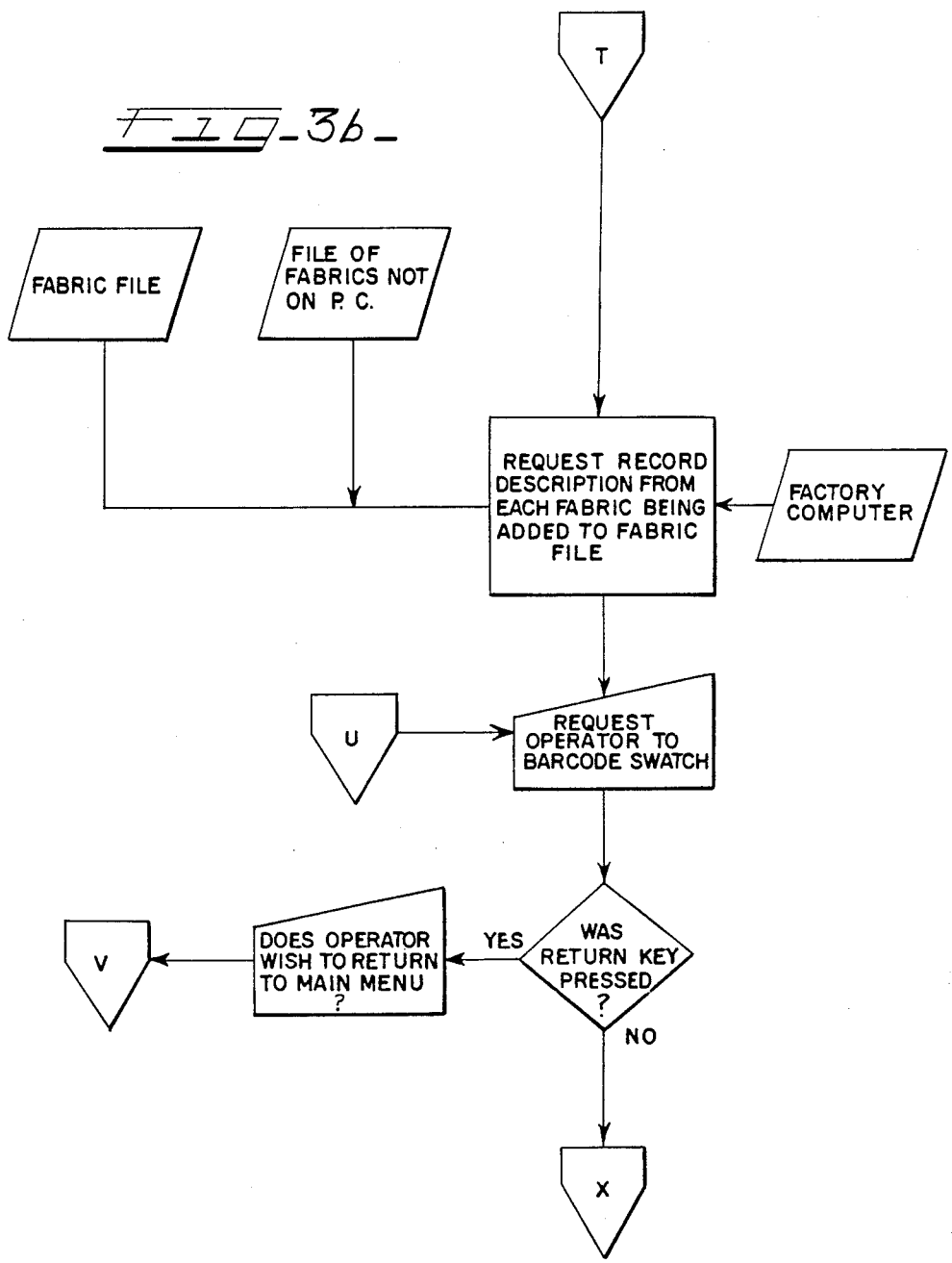
Figure 3D:
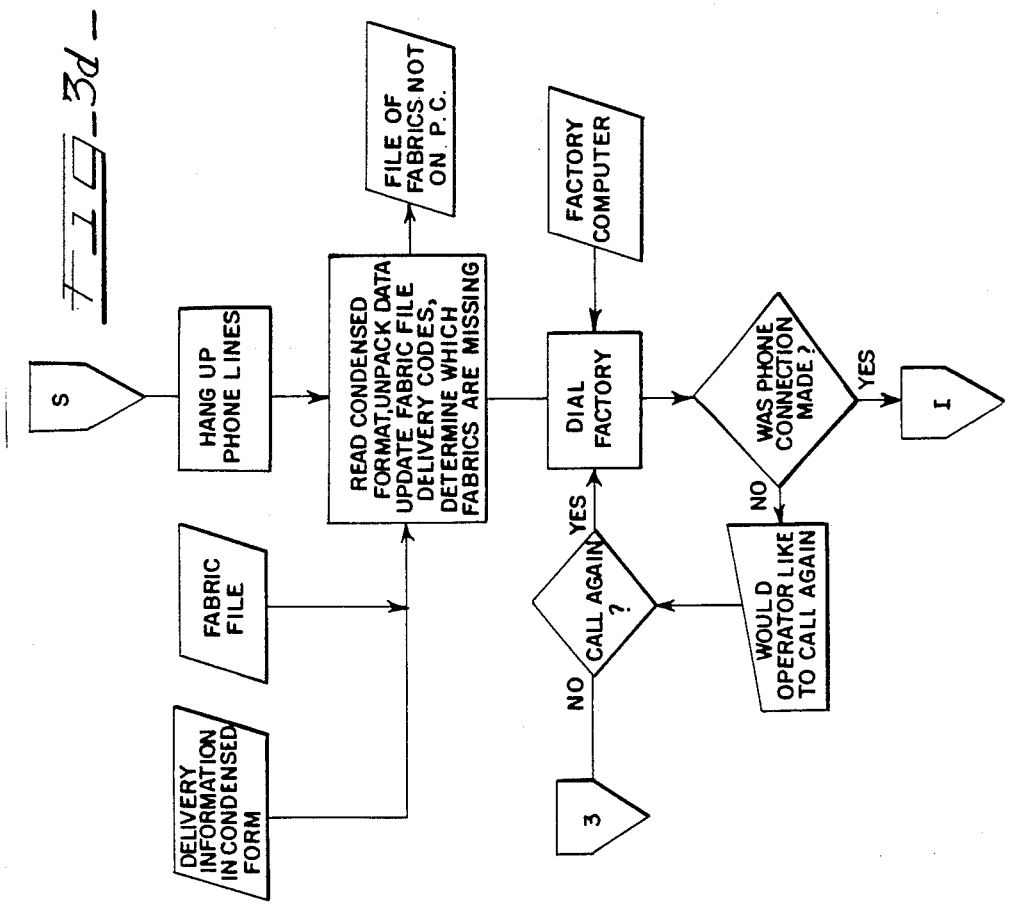
Figure 3C:
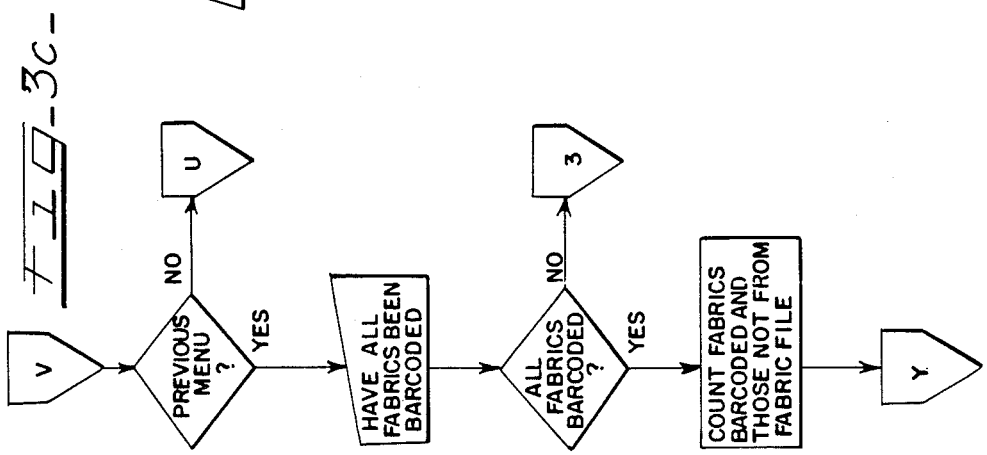
Figure 3E:
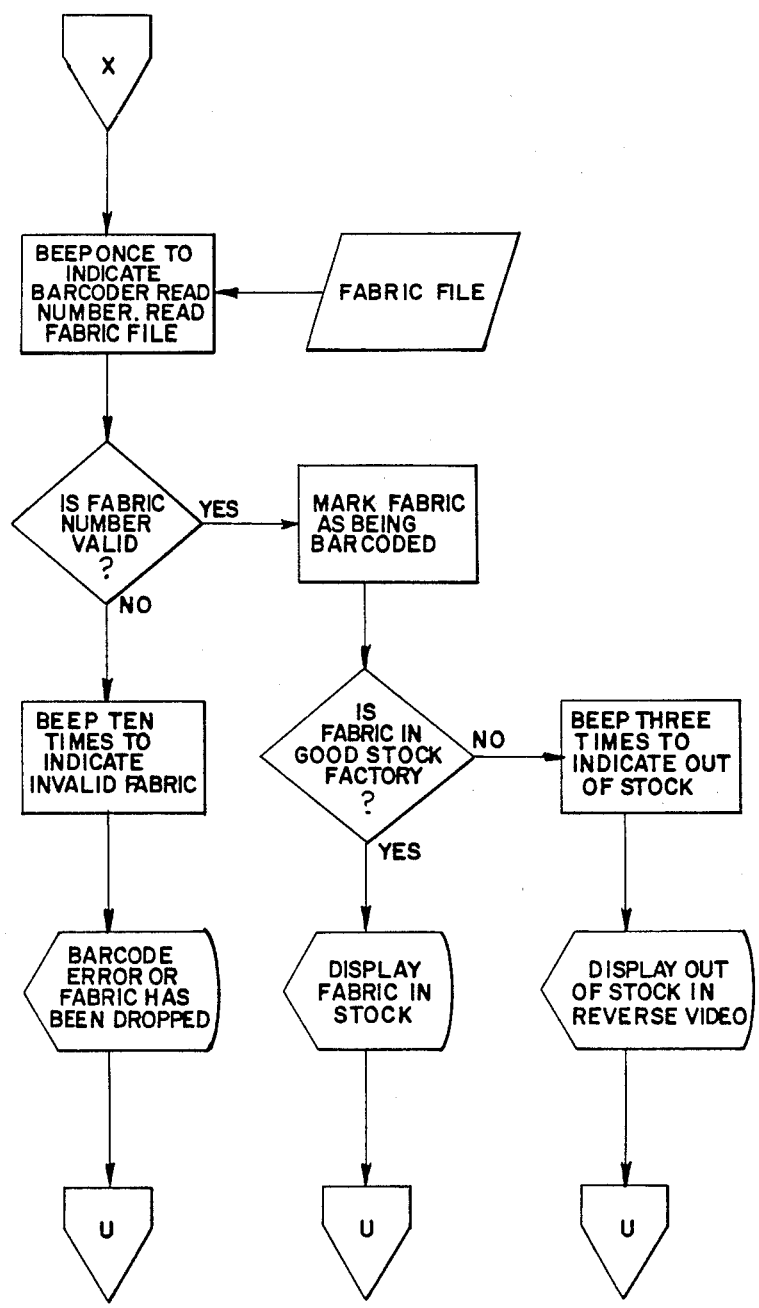
Figure 46:
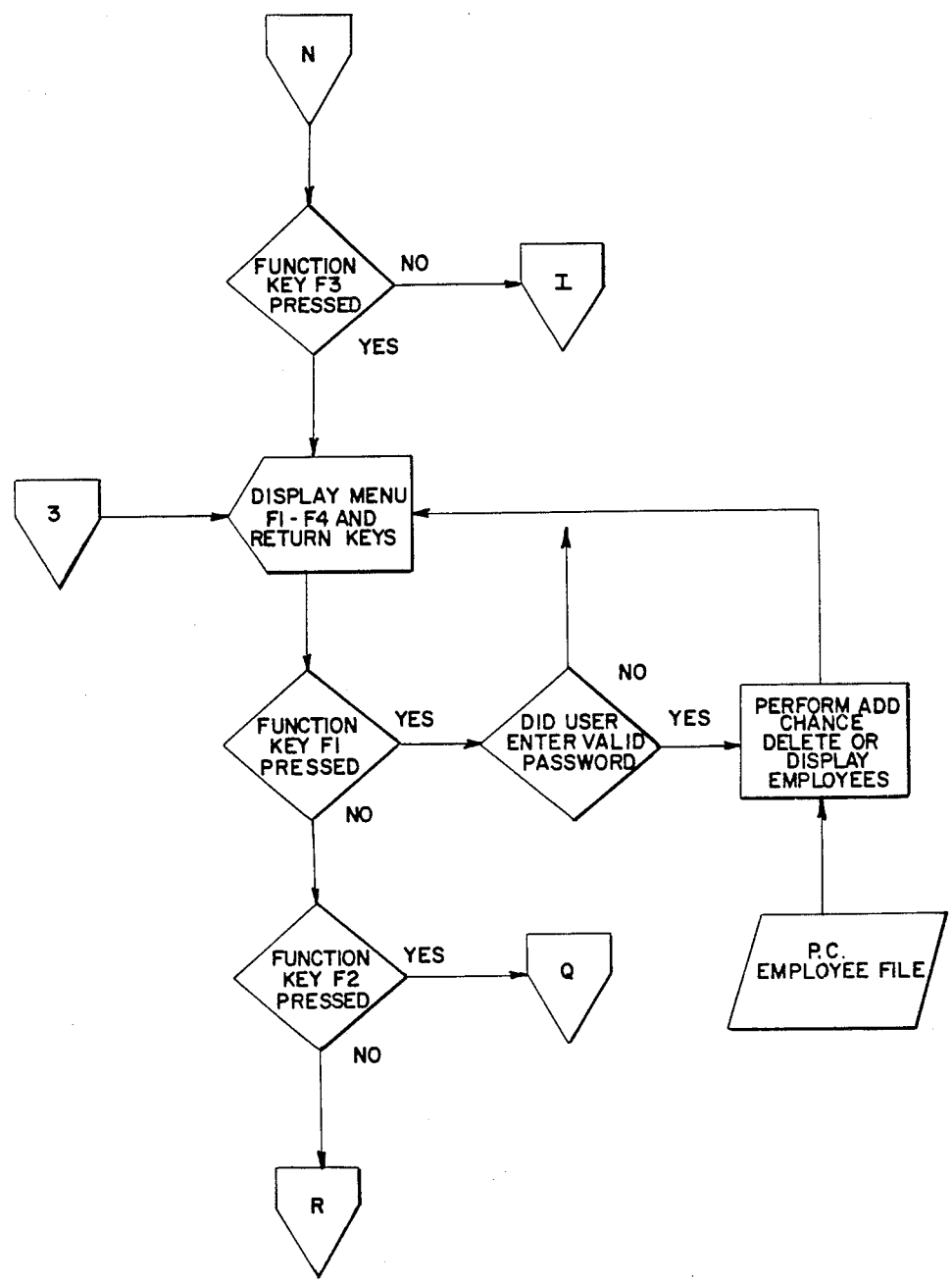

The remote computers employ software which operates in accordance with the flow charts that are illustrated in FIGS. 2, 3 and 4. The flow charts are self explanatory, particularly in light of the detailed description of the operation of the system that has been previously provided. The system software starts at the start block shown in FIG. 2a and the various tasks can be carried out as shown in the flow charts. For purposes of clarification, although it should be apparent to one of ordinary skill in the art, numbered pointed shapes identify input/output operations, which may be present in all of FIGS. 2 through 4. Those pointed shapes that have a letter designation within them are input/output connections that interconnect only two operations of the flow chart. While the flow chart is contained in three drawings, i.e., FIGS. 2 through 4, all of these drawings are interconnected as will be apparent from reviewing them.

From the foregoing, it should be appreciated that an improved system for controlling inventory and sales activity for businesses such as the furniture business has been described, which has many desireable attributes and advantages. The system enables a point of sale establishment to provide accurate information for a customer who desires to special order particular styles and fabrics for pieces of furniture and thereby promote customer satisfaction. The system provides instant communication with the factory to inquire of furniture style and fabric availability, to order such items immediately, and to reserve such items, including the fabrics, thereby helping to insure that expected delivery dates will be met. The point of sale establishment can also maintain an inventory of fabric swatches that can be updated frequently and thereby enable the establishment to display only those samples which represent available fabrics. These and other advantages demonstrate the superiority of the system, which is usefull in many industries and businesses, in addition to the furniture business, which has been the focus of the foregoing description.

Although various embodiments of the invention have been shown and described in full herein, there is no intention to limit the invention to the details of such embodiments. On the contrary, it is the intention that the invention cover all of the various modifications, alternatives, substitutions and equivalents that may fall within the spirit and scope of the invention as set forth in the appended claims.

Various features of the present invention are set forth in the following claims.

What is claimed is:

1. A system for controlling inventory and sales activity for individual items of the type which include a covering material in the items that are to be manufactured, such as furniture pieces, and having multiple and selectable components the choice and selection of which require a variation in the amount of covering material that is required to manufacture the item, such components being such things as multiple selectable fabrics, skirts of various lengths, pleats, quilting or the like, comprising:

a main computing means including a keyboard means for storing information and a memory means for storing information indicative of the available items and the components thereof at a central location, including the cost of the item and components, the immediate availability of the items and components, and the expected delivery of said items and selected components if selected and ordered by a purchaser;

at least one remote computing means, preferably located at a point of sale location, each such remote computing means having a memory means, a display and a keyboard and being adapted to have information entered concerning the purchase of an item, including the identification and quantity of a selected item and of selected components, and the identification of the purchaser;

means for communicating information between the main computing means and each of said remote computing means;

said remote computing means displaying the price of a selected item and selected components and availability of and the expected delivery date thereof in response to data being input to the remote computing means, said availability of and the expected delivery having been determined after having communicated to said main computing means via said communicating means and said main computing means having compared information relating to the amount of covering material required for the selected item and selected components with the inventory of covering material required to manufacture each such selected item and selected components at the central location;

said main computing means thereafter reserving the amount of covering material required for manufacturing the selected item and selected components, and reducing the inventory of covering material available for items and components by the amount of covering material that will be used in manufacturing the items and components selected to update the inventory of available material for future selection.

2. A system as defined in claim 1 further including:

a plurality of samples corresponding to the covering material that can be used in manufacturing said items and components located in at least a majority of said point of sale locations, substantially all of each of said plurality having a machine readable label associated therewith; and, reading means operably connected to said remote computing means and adapted to read said labels and provide information signals to said remote computing means concerning the identification of said covering materials;

said remote computing means displaying the information identifying the covering material in response to receiving information signals from said reading means.

3. A system as defined in claim 2 wherein said covering materials are fabrics for an item of furniture and said samples comprise swatches of said fabrics.

4. A system as defined in claim 1 wherein said means for communicating information comprises a first modem means operably connected to said main computing means and a second modem means operably connected to each of said remote computing means, said first modem means being selectively capable of communicating with each of said second modem means.

5. A system as defined in claim 1 wherein each of said remote computing means is adapted to receive and store price information concerning said items and components from said main computing means, said main computing means periodically updating said price information, so that said remote computing means is adapted to provide price information without the necessity of communicating with the main computing means.

6. A system as defined in claim 1 wherein each of said remote computing means is adapted to receive and store availability information concerning covering materials for said items and components from said main computing means, said main computing means periodically updating said availability information, so that said remote computing means is adapted to provide availability information without the necessity of communicating with the main computing means.

7. A system as defined in claim 1 wherein said remote computing means is adapted to perform various selected functions with respect to setting and changing pricing information for said items and components, establishing identifying information for salespersons and other persons, placing orders for such items and components, and for communicating with the main computing means, each of said functions being classified with a predetermined hierarchical level, so that only persons having information entered in said remote computing means that provides access to selected levels can perform the functions of that level.

8. A system as defined in claim 7 wherein said remote computing means includes means for entering identifying information of a person at the point of sale location, and for designating one of said hierarchical levels of information access for each of said persons that have identifying information entered therein.

9. A system as defined in claim 8 wherein only persons having identifying information entered in said remote computing means enable said remote computing means to communicate with said main computing means to select an item and components and order the same, said remote computing means being enabled to communicate with said main computing means in response to said person entering information into said remote computing means corresponding to the person's identifying information.

10. A system as defined in claim 1 wherein said main computing means includes master information concerning said items and said components, said main computing means being adapted to sequentially communicate with each of said remote computing means and change the information concerning the items and components in the memory means of said remote computing means for the purpose of updating the information of said items and components.

11. A system as defened in claim 10 wherein aid information comprises information concerning the prices of said intems and components.

12. A system as defined in claim 10 wherein said information comprises information concerning the prices of said items and components.

13. A system as defined in claim 10 wherein said information comprises information concerning the availability of said items and components.

14. A system for controlling inventory and sales activity for individual items of the type which include a covering material in the items that are to be manufactured, such as furniture pieces, and having multiple and selectable components the choice and selection of which require a variation in the amount of covering material that is required to manufacture the item, such components being such things as multiple selectable fabrics, skirts of various lengths, pleats, quilting or the like, comprising:

a main computing means including a keyboard means for entering information and a memory means for storing information indicative of the available items and the components thereof at a central location, including the cost of the item and components, the immediate availability of the items and components, and the expected delivery of said items and selected components if selected and ordered by a purchaser;

at least one remote computing means, preferably located at a point of sale location, each such remote computing means having a memory means, a display and a keyboard and being adapted to have information entered concerning the purchase of an item, including the identification and quantity of a selected item and of selected components, and the identification of the purchaser;

means for communicating information between the main computing means and each of said remote computing means;

a plurality of samples corresponding to the covering material that can be used in manufacturing said items and components located in at least a majority of said point of sale locations, substantially all of each of said plurality having a machine readable label associated therewith;

reading means operably connected to said remote computing means and adapted to read said labels and provide information signals to said remote computing means concerning the identification of said covering materials;

one of said reading means and said remote computing means including a sound generating means adapted to produce a first distinctive sound in response to said reading means reading one of said labels, said first distinctive sound indicating that said component is available;

said remote computing means displaying the information identifying the covering material in response to receiving information signals from said reading means;

said remote computing means displaying the price of a selected item and selected components and availability of and the expected delivery date thereof in response to data being input to the remote computing means, said availability of and the expected delivery having been determined after having communicated to said main computing means via said communicating means and said main computing means having compared information relating to the amount of covering material required for the selected item and selected components with the inventory of covering material required to manufacture each such selected item and selected components at the central location;

said main computing means thereafter reducing the inventory of covering material available for items and components by the amount of covering material that will be used in manufacturing the items and components selected to update the inventory of available material for future selection.

15. A system as defined in claim 14 wherein said sound generating means produces a second distinctive sound in response to said reading means reading one of said labels, said second distinctive sound indicating that said component is temporarily unavailable.

16. A system as defined in claim 15 wherein said sound generating means produces a third distinctive sound in response to said reading means reading one of said labels, said third distinctive sound indicating that said component has been discontinued.

17. A system for controlling inventory and sales activity for individual items of the type which include a covering material for covering items to be manufactured, such as furniture pieces having multiple and selectable components, including multiple selectable fabrics or the like, comprising:

a main computing means including a keyboard means for entering information and a memory means for storing information indicative of the available items and the components thereof, including the available fabrics that can be used to cover the items, at a central location, including the cost of the item and components, the immediate availability of the items and components, and the expected delivery of said items and components if selected and ordered by a purchaser;

at least one remote computing means, preferably located at a point of sale location, each such remote computing means having a memory means, a display and a keyboard and being adapted to have information entered concerning the purchase of an item, including the identification and quantity of a selected item and of selected components, and the identification of the purchaser;

means for communicating information between the main computing means and each of said remote computing means;

a plurality of samples corresponding to said selectable fabrics located in at least a majority of said point of sale locations, substantially all of each of said plurality having a machine readable label associated therewith; and, reading means operably connected to said remote computing means and adapted to read said labels and provide information signals to said remote computing means concerning the identification of said fabrics;

said remote computing means being adapted to select items and components, including the fabric that is to cover the items, in response to entering information relating to the same through said remote computing means keyboard or said reading means, said remote computing means enabling said communicating means for communicating with said main computing means, said remote computing means being adapted to enter an order for items and components in response to an enter command sequence by a person;

said remote computing means displaying the information identifying the fabric in response to receiving information signals, said remote computing means displaying the price of a selected item and components, including the fabric, and availability of and the expected delivery date thereof in response to data being input to the remote computing means, said availability of and the expected delivery having been determined after having communicated to said main computing means via said communicating means and said main computing means having compared information relating to the selected item and components, including the fabric, with the inventory of each such selected item and components, including the fabric, at the central location;

said main computing means thereafter reducing the inventory of available items and components, including the fabric, by the amount of items and component, including the fabric selected to update the inventory of available items and components, including the fabric, for future selection.

18. A system for controlling inventory for individual pieces of furniture that is to be manufactured with various optional styles and optional components when ordered by a purchaser, the optional components including multiple selectable fabrics, quilting, skirts of various lengths, arm covers and the like, comprising:

a remote computing means, preferably located at a point of sale location, such computing means having a memory means, a display and a keyboard and being adapted to have information entered concerning the purchase of a piece of furniture, including the identification and quantity of a selected piece of furniture and of selected optional components;

a plurality of display samples corresponding to said selectable fabrics located in at least a majority of said point of sale locations, substantially all of each of said plurality having a machine readable label associated therewith;

reading means operably connected to said computing means and adapted to read said labels and provide information signals to said remote computing means concerning the identification of said fabrics;

said remote computing means displaying the information identifying the fabric in response to receiving information signals from said reading means;

one of said reading means and said remote computing means includes a sound generating means, said system being adapted to produce one of three distinctive sounds in response to said reading means reading one of said labels, said distinctive sounds comprising a first distinctive sound indicating that said fabric is available, a second distinctive sound indicating that said fabric is temporarily unavailable and a third distinctive sound indicating that said fabric has been discontinued;

said system enabling a person to use said reading means to sequentially read the labels of said plurality of display samples and to remove samples that are temporarily unavailable and discontinued.

19. A system for use in selling furniture and for controlling inventory for individual pieces of furniture having multiple and selectable fabrics, such as furniture pieces having multiple selectable fabrics or the like, the system being usable by employees of an establishment where furniture is being offered for sale and by customers who are interested in purchasing furniture, comprising:

a remote computing means, preferably located at an establishment where furniture is being offered for sale such computing means having a memory means, a display and a keyboard and being adapted to have information entered concerning the purchase of an item of furniture, including the identification and quantity of a selected pieces of furniture and of selected fabrics;

a plurality of swatches of fabrics located in at least a majority of said establishments where furniture is available for sale, said swatches being categorized as swatches of fabrics that are available, temporarily unavailable and discontinued, substantially all of each of said plurality of swatches having a machine readable label associated therewith;

reading means operably connected to said computing means and adapted to read said labels and provide information signals to said computing means concerning the identification of said fabric;

said remote computing means displaying the information identifying the fabric in response to receiving information signals from said reading means;

one of said reading means and said remote computing means includes a sound generating means, said system being adapted to produce one of three distinctive sounds in response to said reading means reading one of said labels, said distinctive sounds comprising a first distinctive sound indicating that said fabric is available, a second distinctive sound indicating that said fabric is temporarily unavailable and a third distinctive sound indicating that said fabric has been discontinued;

said system enabling an employee to use said reading means to sequentially read the labels of said plurality of swatches and to remove swatches that are temporarily unavailable and discontinued and to replace samples from an inventory of samples that had been temporarily unavailable, and by a customer to read a label and have the computing means display information relating to the particular fabric which has been read.

20. A system as defined in claim 19 further including a main computing means located at a single site and means for communicating information comprising a first modem means operably connected to said main computing means and a second modem means operably connected to each of said remote computing means, said first modem means being selectively capable of communicating with each of said second modem means.

21. A system as defined in claim 19 wherein each of said remote computing means is adapted to receive and store price information concerning said pieces and fabrics from said main computing means, said main computing means periodically updating said price information, so that said remote computing means is adapted to provide price information without the necessity of communicating with the main computing means.

22. A system as defined in claim 19 wherein each of said remote computing means is adapted to receive and store availability information concerning said pieces and fabrics from said main computing means, said main computing means periodically updating said availability information, so that said remote computing means is adapted to provide availability information without the necessity of communicating with the main computing means.

23. A system as defined in claim 19 wherein said remote computing means is adapted to perform various selected functions with respect to setting and changing pricing information for said pieces and fabrics, establishing identifying information for salespersons and other persons, placing orders for such pieces and fabrics, and for communicating with the main computing means, each of said functions being classified with a predetermined hierarchical level, so that only persons having information entered in said remote computing means that provides access to selected levels can perform the functions of that level.

24. A system as defined in claim 23 wherein said remote computing means includes means for entering identifying information of a person at the point of sale location, and for designating one of said hierarchical levels of information access for each of said persons that have identifying information entered therein.

25. A system as defined in claim 24 wherein only persons having identifying information entered in said remote computing means enable said remote computing means to communicate with said main computing means to select a piece and fabrics and order the same, said remote computing means being enabled to communicate with said main computing means in response to said person entering information into said remote computing means corresponding to the person's identifying information.

26. A system as defined in claim 19 wherein said main computing means includes master information concerning said pieces and said fabrics, said main computing means being adapted to sequentially communicate with each of said remote computing means and change the information concerning the pieces and fabrics in the memory means of said remote computing means for the purpose of updating the information of said pieces and fabrics.

27. A system as defined in claim 26 wherein said information comprises information concerning the prices of said pieces and fabrics.

28. A system as defined in claim 26 wherein said information comprises information concerning the availability of said pieces and fabrics.

29. A system as defined in claim 26 wherein said information comprises information concerning the delivery of said pieces and fabrics.

* * * * *

UNITED STATES PATENT AND TRADEMARK OFFICE
CERTIFICATE OF CORRECTION

PATENT NO. : 4,887,208

DATED : December 12, 1989

INVENTOR(S) : Schneider et al.

It is certified that error appears in the above-identified patent and that said Letters Patent is hereby corrected as shown below:

Column 3, line 3, change "any" to --many--.

Column 5, line 65, change "it" to --if--.

Column 6, line 13, change "hissing" to --missing--.

Column 15, line 15, change "storing" to --entering--.

Column 17, line 1, change "aid" to --said--.

Column 17, line 6, change "prices" to --availability--.

Column 17, line 9, change "availability" to --delivery--.

Signed and Sealed this

Nineteenth Day of March, 1991

Attest:

HARRY F. MANBECK, JR.

*Attesting Officer*  *Commissioner of Patents and Trademarks*